US009548003B2

(12) United States Patent
Forte et al.

(10) Patent No.: US 9,548,003 B2
(45) Date of Patent: Jan. 17, 2017

(54) SYSTEM, METHOD AND COMPUTER PROGRAM FOR TRAINING FOR MEDICAL EXAMINATIONS INVOLVING BODY PARTS WITH CONCEALED ANATOMY

(76) Inventors: Vito Forte, Toronto (CA); Paolo Campisi, Etobicoke (CA)

(*) Notice: Subject to any disclaimer, the term of this patent is extended or adjusted under 35 U.S.C. 154(b) by 332 days.

(21) Appl. No.: 14/111,234

(22) PCT Filed: Apr. 20, 2012

(86) PCT No.: PCT/CA2012/000359
§ 371 (c)(1),
(2), (4) Date: Jan. 28, 2014

(87) PCT Pub. No.: WO2012/142697
PCT Pub. Date: Oct. 26, 2012

(65) Prior Publication Data
US 2014/0134587 A1 May 15, 2014

Related U.S. Application Data

(60) Provisional application No. 61/477,421, filed on Apr. 20, 2011.

(51) Int. Cl.
*G09B 23/28* (2006.01)
*G09B 23/30* (2006.01)

(52) U.S. Cl.
CPC .................................. *G09B 23/30* (2013.01)

(58) Field of Classification Search
CPC .......... G09B 9/00; G09B 23/30; A61B 19/50; A61B 19/5244; A61B 2017/00707; A61B 2019/2292; A61B 2019/464
(Continued)

(56) References Cited

U.S. PATENT DOCUMENTS 4,907,973 A * 3/1990 Hon ..................... G09B 23/285
434/262
5,505,623 A * 4/1996 Chernack ............... G09B 23/30
434/270
(Continued)

FOREIGN PATENT DOCUMENTS

CA 2716746 A1 9/2009
CN 102016957 A 4/2011

OTHER PUBLICATIONS

WIPO, Written Opinion and International Search Report dated Aug. 14, 2012, issued in corresponding International Patent Application No. PCT/CA2012/000359.
(Continued)

*Primary Examiner* — Robert J Utama
*Assistant Examiner* — Jerry-Daryl Fletcher
(74) *Attorney, Agent, or Firm* — Norton Rose Fulbright Canada LLP

(57) ABSTRACT

The present invention is a medical training simulation apparatus for training of medical professionals in medical examinations involving body parts with concealed geometry. The apparatus may comprise a physical model of a body part having an opening and structure that simulates the concealed geometry of a body part and may receive an inserted medical tool. A video display may be disposed within the structure of the apparatus to display at least one image of a physical defect or medical condition for the body part. The at least one image may e be alterable such that its appearance simulates the appearance of the defect or medical condition within the concealed geometry when viewed using the medical tool in relation to an applicable human or animal subject patient. The training apparatus is operable for one or more simulations for training a trainee in a medical
(Continued)

examination or procedure for a body part in accordance with a training method.

20 Claims, 10 Drawing Sheets

(58) Field of Classification Search
USPC .................................. 434/262, 267, 270, 272
See application file for complete search history.

(56) References Cited

U.S. PATENT DOCUMENTS

| | | | | |
|---|---|---|---|---|
| 5,553,618 A * | 9/1996 | Suzuki | ................... | G01R 33/28 600/411 |
| 5,864,326 A * | 1/1999 | Rallison | ............. | G02B 27/0101 345/7 |
| 5,909,380 A * | 6/1999 | Dubois | ................. | G09B 23/28 351/205 |
| 2001/0055748 A1 * | 12/2001 | Bailey | ................... | G09B 23/285 434/262 |
| 2003/0091967 A1 * | 5/2003 | Chosack | ................. | G06T 15/00 434/262 |
| 2004/0048230 A1 | 3/2004 | Alexander et al. | | |
| 2005/0064378 A1 * | 3/2005 | Toly | ..................... | G09B 23/285 434/262 |
| 2005/0181342 A1 * | 8/2005 | Toly | ....................... | G09B 23/30 434/262 |

OTHER PUBLICATIONS

The Patent Office of the People's Republic of China, Search Report dated Jul. 31, 2015, issued in corresponding Chinese Patent Application No. 2012800287956.

The Patent Office of the People's Republic of China, First Office Action dated Aug. 14, 2015, issued in corresponding Chinese Patent Application No. 2012800287956.

* cited by examiner

SYSTEM, METHOD AND COMPUTER PROGRAM FOR TRAINING FOR MEDICAL EXAMINATIONS INVOLVING BODY PARTS WITH CONCEALED ANATOMY

FIELD OF THE INVENTION

The present invention relates to computer implemented training systems. The present invention more specifically relates to computer implemented training systems that simulate body parts to build skills pertaining to conducting medical examinations or procedures.

BACKGROUND OF THE INVENTION

Numerous medical examinations or procedures involve body parts with concealed anatomy, such as the ear, nose, throat or eye. These medical examinations or procedures generally involve the use of a specialized medical tool, for example, such as in an otoscope used to conduct an ear examination.

At most medical schools, training in medical examinations or procedures relating to body parts with concealed anatomy involves visual identification of possible defects or medical conditions. The training is generally conducted through the use of basic tools, such as slide presentations including photos of the physical defects or medical conditions. Some estimate that only around five percent of medical students feel comfortable about their skills to use specialized medical tools, for example, such as with their otology skills, at the end of their residency.

Prior art medical training systems are known. For example, the "NASCOLIFEFORM", and United States Publication No. 2008/0050710 both include a model of a head or portion of a head, which contains an area that can receive one of a plurality of inserts that simulate an ear and also the ear canal. Such inserts are formed so that the inside of the model of the ear canal shows a physical defect or medical condition. The inserts are generally made of a flexible material such that trainees may pull on the ear portion thus also displacing the ear canal as is required in otoscopy examinations.

As another example, U.S. Pat. No. 6,241,526, issued to Auran et al., discloses a device for training physicians in tympanocentesis. The device includes an outer member resembling a side profile of a child's head and shoulder area. The outer member is attached to a surface portion to define a receiving area for receiving a slidable inner member or insert. A replica of at least an eardrum and an ear canal of a child's inner ear are associated with the sliding inner member. A training portion of the inner member supports a simulated inner ear, positions the simulated inner ear to a desired position adjacent the outer ear of the outer member, and acts as a holder for the training cartridges used with the training device. The cartridges or inserts simulate the "look and feel" of popping through the tympanic membrane. The cartridges include one or more training areas. The disclosed prior art invention trains the user in proper location and depth. Once all of the training areas of the cartridge have been used, it is replaced with a new cartridge.

There are several drawbacks to the prior art training systems. For example, the trainer cannot see the image of the physical defect or medical condition at the same time as it is shown to the trainee. Another drawback is that manual changing of the ear inserts is required for the prior art system. Yet another drawback is that, because of cost, the number of inserts is often limited in the prior art system. The limited number of inserts can reduce the number of images of physical defects or medical conditions to which the trainees are exposed through use of the training system.

SUMMARY OF THE INVENTION

The present invention provides a medical examination or procedure training method comprising the steps of: (a) one or more users engaging a simulation apparatus to initiate a medical examination or procedure training routine, by means of one or more computer processors, the simulation system including a video display, and a controller for controlling the video display to enable the display of one or more images of a defect or medical condition; (b) the one or more users inserting a medical examination tool into an opening defined by the simulation system; (c) the one or more users using the medical examination tool to view an interior defined by the simulation system that simulates the concealed anatomy of a body part by optically altering the one or more images so as to simulate the appearance of the interior in the body part when viewed using the medical examination tool.

The present invention also provides a medical examination or procedure training apparatus comprising: (a) a physical model of a body part, the physical model including an opening and defining a structure that simulates concealed geometry of a body part, (b) the opening being configured to enable a trainee to insert a medical examination or procedure tool, (c) a video display controllable to display at least one image of a defect or medical condition for the body part, and (d) means for altering the at least one image such that its appearance simulates the appearance of the defect or medical condition disposed within the concealed geometry when viewed using the medical examination or procedure tool in relation to the applicable human or animal subject, such that the training apparatus enables one or more simulations for training the trainee in the medical examination or procedure for the body part.

In one aspect, the present disclosure relates to a medical training method, characterized in that it comprises the steps of: one or more users engaging a simulation apparatus to initiate a medical training routine, by means of one or more computer processors, the simulation system including a video display, and a controller for controlling the video display the displays one or more medical images; each of the one or more users inserting a medical tool into an opening defined by the simulation system to represent a body part; and the one or more users using the medical examination tool to view an interior defined by the simulation system that simulates the concealed anatomy of the body part by optically altering the one or more images so as to simulate the appearance of the interior of the body part when viewed using the medical tool.

Said medical training method is characterized in that it may also comprise the further step of the one or more users engaging the simulation apparatus to initiate a medical training routine that is any of the following: a simulated medical examination; or a simulated medical procedure.

Said medical training method is characterized in that it may also comprise the further step of video display displaying the one or more images and thereby simulating any of the following: a physical defect; or a medical condition.

Said medical training method is characterized in that it may also comprise the further step of a trainer controlling the controller to control the display of the one or more images by the video display to at least one of the one or more users.

Said medical training method is characterized in that it may also comprise the further step of the trainer accessing training program materials and controlling the controller in association with the training program materials to train the at least one of the one or more users.

Said medical training method is characterized in that it may also comprise the further step of the trainer training the at least one of the one or more users by using the training program materials and providing oral instruction relating thereto.

Said medical training method is characterized in that it may also comprise the further step of the one or more users testing their skills of manipulation of the medical tool when said medical tool is inserted in the opening of the simulation system, and identification of a physical defect or medical condition the appearance of which is simulated by the simulator system.

In another aspect, the present disclosure relates to a medical training apparatus, characterized in that the apparatus comprises: one or more physical models of a body part consecutively attachable to the medical training apparatus, each physical model including an opening and defining a structure that simulates concealed geometry of a body part, said opening being configured to enable a trainee to insert a medical tool therein; a video display controllable to display at least one medical image relating to the body part of one of the one or more physical models attached to the medical training apparatus; and a means for altering the at least one image such that its appearance simulates the appearance within the concealed geometry of a condition existing within the body part of the one of the one or more physical models attached to the medical training apparatus when viewed using the medical tool inserted in the physical model; and said medical training apparatus being operable to achieve a simulation for training the trainee to: manipulate the medical tool within the body part of the physical model; and identify the condition within the concealed geometry of the body part of the one of the one or more physical models attached to the medical training apparatus.

Said medical training apparatus is characterized in that it may also further comprise the one or more physical models being models of any body part having concealed geometry including any of the following body parts: an ear; a nose; an eye; or a throat.

Said medical training apparatus is characterized in that it may be operable for training simulations including any of the following: medical procedure training; and medical examination training.

Said medical training apparatus is characterized in that the medical tool may be a medical tool appropriate for insertion into the body part of the physical model attached to the apparatus.

Said medical training apparatus characterized in that the one or more medical images may be images of any of the following relating to the body parts of the physical models: physical defects; and medical conditions.

Said medical training apparatus is characterized in it may also further comprise a computer incorporating one or more computer processors configured to operate a computer program, said computer program being operable to control a medical training module and control the video display and the display of the one or more medical images for the purpose of training the trainee.

Said medical training apparatus is characterized in that it may also further comprise an input means connected to the computer for operation of the computer program by a trainer to control the medical training module.

Said medical training apparatus is characterized in that it may also further comprise a database connected to the medical training apparatus wherein the one or more medical images are stored.

Said medical training apparatus is characterized in that it may also further comprise an optical means positioned between the physical model attached to the apparatus and the video display, said optical means being operable to de-pixelate the one or more medical images displayed on the video display.

Said medical training apparatus is characterized in that the one or more physical models may be formed of a material that simulates the physiology of the body part of each the physical model.

Said medical training apparatus is characterized in that one or more sensors may be positioned within the apparatus so as to be configured to correspond to the sensitivity of the body part of the physical model, said one or more sensors being operable to sense force or other simulated sensitization imposed upon the body part of the physical model by the medical tool used by the trainee.

In another aspect, the present disclosure relates to a medical training system, characterized in that the system comprises: one or more medical training apparatuses operable to achieve a simulation for training one or more trainees, each medical training apparatus comprising: one or more physical models of a body part consecutively attachable to the medical training apparatus, each physical model including an opening and defining a structure that simulates concealed geometry of a body part, said opening being configured to enable a trainee to insert a medical tool therein; a video display controllable to display at least one medical image relating to the body part of one of the one or more physical models attached to the medical training apparatus; and a means for altering the at least one image such that its appearance simulates the appearance within the concealed geometry of a condition existing within the body part of the one of the one or more physical models attached to the medical training apparatus when viewed using the medical tool inserted in the physical model; and one or more computers linked to one or more of the one or more medical training apparatuses, each of the one or more computers incorporating one or more computer processors configured to operate a computer program, said computer program being operable to control a medical training module and control the video display and the display of the one or more medical images for the purpose of training the one or more trainees.

Said medical training system is characterized in that the system may also further comprise: the trainer operating one of the one or more computers and the medical training module thereon to instruct one or more of the one or more trainees, each of the one or more trainees having access to an apparatus, and an oral communication means operable to provide oral communication between the trainer and the one or more trainees being trained by the trainer.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The present invention enables the provision of such instruction and permits users to practice examination in an effective manner. The system, computer program, and method of the invention represent a significant advancement of the art, and provide a practical and cost effective system for broader dissemination of such instruction and/or practice.

DESCRIPTION OF THE DRAWINGS

The invention will be better understood and objects of the invention will become apparent when consideration is given to the following detailed description thereof. Such description makes reference to the annexed drawings wherein.

Figure 1:
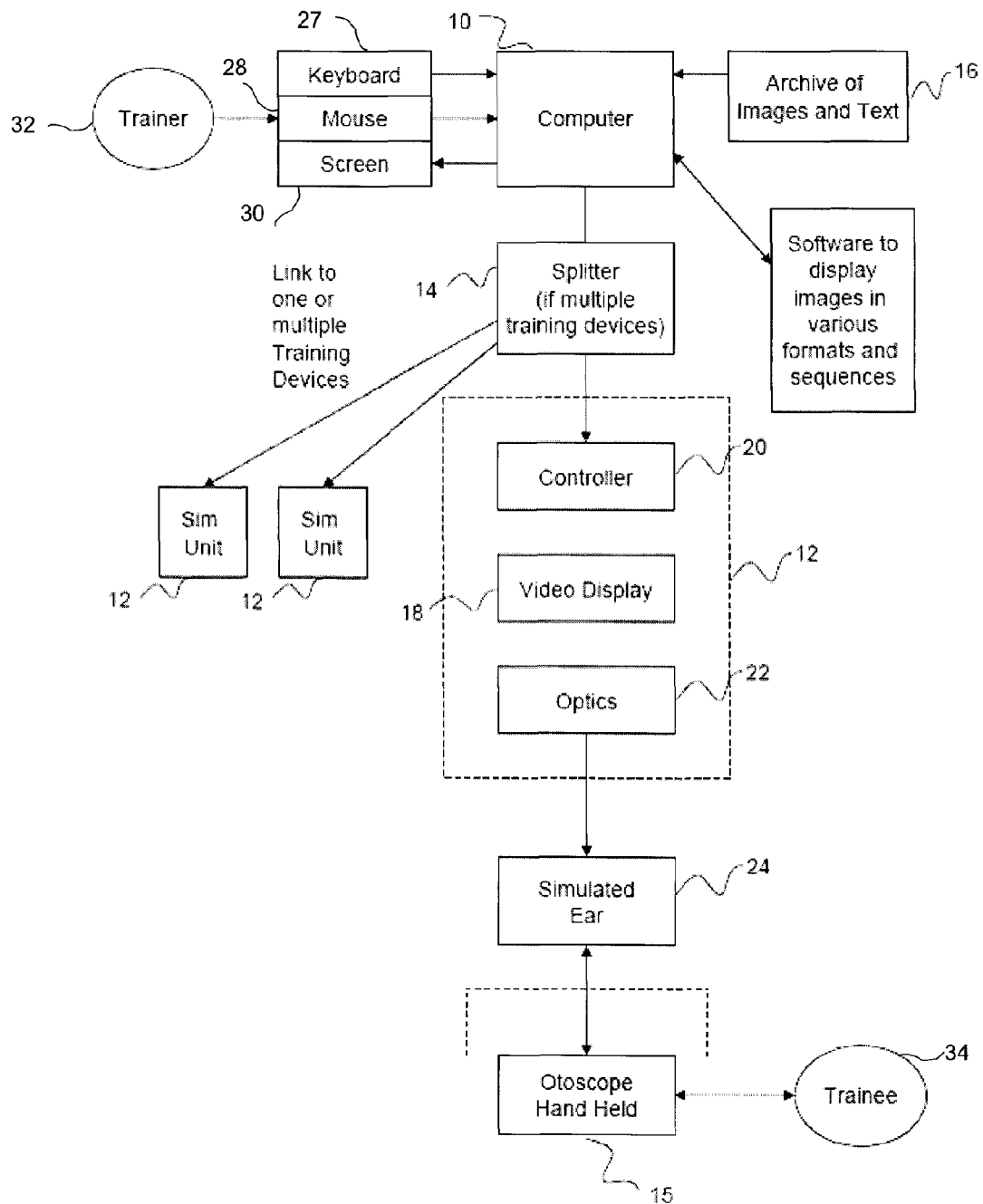
FIG. 1 is a system diagram showing a representative implementation of the system of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

The invention is a medical training simulation apparatus, system and computer product that includes: (a) a physical model of a body part of a human or animal that has concealed anatomy (for example the concealed anatomy may be because of an orifice such as an ear canal, nose, throat, or may be other types of concealed anatomy, such as the concealed anatomy of an eye); and (b) a viewer for viewing one or more images of physical defects or medical conditions affecting the body part. The physical model may be created to enable a human user to use a specialized medical examination tool, such as would normally be used by a medical professional, to examine the body part.

In embodiments of the present invention, there may be several physical models of various body parts provided as part of the medical training simulation apparatus. The physical models may each be used individually with the viewer. For example, a physical model that is an ear body part may be used with the viewer at one point and then be removed and replaced with another physical model for another body part, such as a nose. In this manner the multiple physical models allow the medical training simulation apparatus to be used for training pertaining to: (a) the use of multiple specialized medical examination tools; and (b) multiple of body parts.

Many of the examples provided herein relate to a physical model that is an ear body part and the use of the present invention for training a trainee to use an otoscope (for example, such as is shown in FIGS. 2-6 and 7a-7f). However, a skilled reader will recognize that, in addition to the ear, the present invention can be utilized for training a trainee to use other specialized medical examination tools in relation to other body parts. For example, such as the examination of the eye using an ophthalmoscope (as is shown in FIG. 8), the examination of the throat using a laryngoscope, or the examination of the nose using a rhinoscope.

The present invention may be utilized to train trainees, for example, such as medical professionals, to accurately identify physical defects or medical conditions while using specialized medical tools to investigate concealed anatomy. Body parts with concealed anatomy can represent difficult diagnostic environments. It is therefore important for medical practitioner trainees to learn to navigate within body parts with concealed anatomy environments. Navigation within such body parts requires learning to manipulate a specialized medical tool within the concealed anatomy, for example, such as an orifice defined by the body part with concealed anatomy. The present invention is operable to allow a trainee to learn to navigate a medical tool within a body part with concealed anatomy, which is represented by the physical model element of the present invention. As an example, if the concealed body part represented by the physical model of an implementation of embodiment of the present invention is an ear, the trainee can utilize the present invention to learn to manipulate an otoscope in an ear canal.

In order to provide robust training to trainees, the viewer of the training system of the present invention may provide ready access to images of various defects or medical conditions that can affect the relevant body part that is part of the present invention during the training session. The trainee can therefore view a representation of a physical defect or medical condition relating to a particular body part through a medical tool and in the environment of the body part, which is provided by the physical model element of the present invention. In this manner, the present invention is operable to train a trainee to learn how physical defects or medical conditions will appear specifically within the environment of a body part when viewed through a medical tool. This allows medical practitioners to learn to be able to identify such physical defects or medical conditions in difficult diagnostic environments.

The present invention represents benefits and advantages over the prior art. For example, prior art training techniques are not generally effective in training medical professionals to navigate effectively within concealed anatomy, for example, such as concealed anatomy of an ear. In the case of otoscopy, trainees can inflict significant pain upon patients if they are not well trained in manipulation of an otoscope within the concealed anatomy of an ear before using an otoscope on a patient. Too much force, inept manipulation, and a preoccupation with trying to manipulate the otoscope in order to view a physical defect or medical condition in the environment of concealed anatomy, such as an ear canal, through the otoscope can be reasons why a medical practitioner may inadvertently cause pain for a patient. In particular, a preoccupation with seeing through an otoscope sufficiently well to accurately identify a physical defect or medical condition can be a hazard for medical practitioners before they improve their technique. Therefore, requiring a medical practitioner to learn to manipulate a medical tool in a body part with concealed anatomy of a live subject and to accurately identify any physical defect or medical condition therein is clearly not desirable. Moreover, for this reason human subjects willing to participate in training of medical professionals are not easy to find. The present invention offers a benefit over the prior art in that it is a medical training apparatus and system operable to provide effective instruction for medical examinations involving body parts with concealed anatomy.

Prior art systems further fail to simulate the environment within which a medical tool is to be manipulated and other aspects of a medical examination. The present invention offers a benefit in that it is a training apparatus and system that both simulates the environment within which a medical tool is manipulated in connection with a medical examination or procedure conducted for a body part with concealed anatomy. The present invention further provides ready access to a series of images of physical defects or medical conditions pertaining to the body part. The images are presented in a way that simulates the appearance of such physical defects or medical conditions in the course of conducting the medical examination or procedure in a real subject patient. Therefore, the present invention is a training system whereby a trainee can learn to manipulate a medical tool within a body part with concealed anatomy and to accurately identify a physical defect or medical condition in a simulated environment that closely resembles the environment of a live subject patient.

Additionally, the present invention is a training system and apparatus that is simple to use and cost effective. Prior art training systems are not simple to use or cost effective, and therefore this represents yet another benefit of the present invention over the prior art. That the present invention is simple to use and cost effective represent aspects that cause the present invention to be utilizable in a variety of medical training environments by a variety of medical trainees.

The present invention may be made widely available and accessible for purposes of training medical practitioners. Training using the present invention may have the outcome that that discomfort, pain or injury to patients is avoided because training occurs before the medical professional conducts an examination of a patient. The present invention may further improve the ability of medical professionals who have used the training system to accurately identify relevant physical defects or medical conditions existing in concealed anatomy of a body part, and thereby improve the effectiveness and efficiency of diagnosis of such defects and conditions.

In embodiments of the present invention, the medical training simulation apparatus and system may be configured to enable a human user of the present invention to use a medical examination tool in relation to the physical model. The use of a medical tool in relation to a body part is required in a medical examination of the body part. Therefore, the present invention simulates a medical examination of a body part. The trainee may view one or more images of physical defects or medical conditions affecting that body part in a way that simulates the appearance of such defects or conditions as they would be viewed during a medical examination of a live patient. Therefore, the present invention is operable to simulate the whole of the experience of a medical examination as experienced by a medical professional, including use of a medical tool, manipulation of the medical tool in a body part, viewing of a physical defect or medical condition in the body party (which generally involves viewing through the medical tool), and identification of the defect or condition.

The present invention may include physical models that represent body parts of humans or animal subjects. The viewer may further provide images relating to the body part of a human or an animal, and relevant physical defects of medical conditions of that body part of a human or animal. Therefore, the present invention may be used to train a trainee in a simulated environment relevant to a human or animal subject. A skilled reader will recognize the variety of physical models and images viewable through the viewer that may be incorporated in the present invention and the multiple environments that may be simulated by the present invention for training purposes.

The present invention offers still another benefit over prior art solutions in that it provides a training apparatus and system operable to enable highly effective medical training. The effectiveness of the training of the present invention is in part due to the operability of the present invention to enable the user to use the appropriate medical examination tool in relation to the physical model which represents the appropriate anatomy. The effectiveness of the present invention is also related to the operability of the present invention to display one or more images of physical defects or medical conditions relevant to the physical model integrated through a connection to present invention. The images are provided in the present invention so that the physical model and viewer in combination simulate real life anatomical geometry. The overall presentation of the present invention simulates the use of a medical tool in a body part and view through the medical tool of in relation to the body part in a human or animal subject. Prior art training systems do not offer the simulation environment offered by the present invention.

Thus, the medical training simulation apparatus and system of the present invention provides a significant advancement over the prior art. The present invention provides access to a significant number of images of physical defects or medical conditions relevant to a body part in the environment of the body part. The present invention is further cost effective and therefore accessible to a significant proportion of medical professional trainees. The present invention, therefore, can play a role in providing access to important medical training that the prior art cannot achieve.

In one embodiment of the present invention, a medical training system may be provided that includes one or more combinations of the physical model and viewer which are connected together to form a medical training simulation apparatus, and a further connection from each combination of physical mode and viewer, by a wired or wireless means, to one or more computers. At least one of the one or more computers may be operable by a trainer. The trainer may utilize at least one of the one or more computers to guide one or more trainees working at one medical training simulation apparatus through one or more training sessions. The computer or computers operated by the trainer may be configured as required for the trainer to provide training to the trainees.

In such an embodiment, each trainee may have access to a medical training simulation apparatus that is connected to a medical training computer program by way of a server, computer or other means. The medical training computer program may be operable to initiate one or more medical training routines. The medical training routines may control one or more of the medical training simulation apparatuses that are linked to the medical training computer program. A trainer may operate the medical training computer program, and thereby control the medical training routine provided to the medical training simulation apparatus.

The medical training simulation apparatus utilized by a trainee may be located remotely from the computer or other means operating the medical training computer program that is controlled by the trainer. Thus, the trainee and trainer may be distantly located from one another. Alternatively, the trainee and the trainer may be closely located to one another. A skilled reader will recognize that variety of methods of configuring the apparatus and the computer or other means controlling the medical training computer program so that these elements are closely or remotely located from each other, for example, such as the incorporation of connections to one or more servers, the incorporation of an Internet connection, the incorporation of a cloud computing element, or other means.

The medical training computer program may be operable to enable one or more medical professional trainers to guide one or more trainees. A medical training simulation apparatus must be accessible to each of the one or more trainees. Each trainer may utilize the medical training computer program to guide one or more trainees through one or more medical training routines for which each trainee uses his or her medical training simulation apparatus. Thus, each trainer may train one or more trainees, and multiple groupings of trainee(s) and trainer may exist. Each grouping of trainee(s) and trainer may utilize the medical training computer program to operate different medical training routines, or the same medical training routine, but at a different pace. Thus, each grouping of trainee(s) and trainer may operate to undertake training using the medical training computer program independently but simultaneously. It may also be possible for one trainer to utilize the medical training computer program to train multiple groups of one or more trainee simultaneously.

A trainer may utilize a computer, a tablet, a smart phone or any other device or means to provide training utilize the medical training computer program to one or more trainees. In some embodiments of the present invention, the trainer may view an image that is projected in the apparatus of the one or more trainees as well as additional information, such as teaching notes or other data or other images. The trainer may also be provided with tools that allow for indicating particular areas of interest in the images presented to the trainees. A skilled reader will recognize the various means of indicating particular areas of interest in the images that may be available to the trainer.

A trainer who is closely located to the trainees, for example, such as in the same room, or other close vicinity, may provide oral instructions, lectures or other training to the trainees. The trainer may utilize the additional information provided by the medical training computer program in the course of providing oral training to the trainees.

A trainer who is located remotely from the trainees may provide oral instruction, lectures or other training to the trainees by way of an audio means, for example, such as by way of a telephone, a smart phone, a speaker system, a computer, a tablet, a laptop, video conferencing, or some other device or means of providing oral communication to a party located remotely from the speaker. In this manner, the trainees may each receive oral communication through an oral communication means, whereby the trainer may provide instruction to the trainees. A skilled reader will recognize the oral communication means and devices that may be incorporated in the present invention for this purpose, and that such means and devices may be integrated with the present invention or provided in cooperation with the present invention. For example, a trainee may use a conference telephone call simultaneously in cooperation with use of the present invention to provide oral communication, or the medical training computer program may be configured to collect the oral communication from the instructor and to distribute this to the trainees. In embodiments of the present invention, the communication between a trainer and the one or more trainees may be two-way so that the trainer can communicate orally with the trainees and the trainees can communicate orally with the trainer.

All oral communication to the trainees, whether they are closely located or remotely located from the trainer, may be provided additionally to, or simultaneously with, the presentation of images to the trainees in the apparatus through the use of the medical training computer program that is linked to the viewer element of the apparatus.

A trainer may further utilize the medical training computer program so as to present images to the trainees in the apparatus, by way of the viewer element, without providing any oral communication. For example, a trainer may present images to the trainees to test the trainees' skills for use of the apparatus and/or use of the medical tool with the apparatus, or to provide for the trainee to practice such skills and use of the medical tool. A skilled reader will recognize other various instances when a trainer may not provide any oral communication to the trainees.

As noted before, medical examination of body parts with concealed anatomy usually involves use of a specialized medical examination tool, for example, such as an otoscope in the case of ear examinations. The proper use of such medical tools generally requires instruction and practice. If a medical tool is not used properly, the medical examination may be ineffective. For example, if a medical tool is not used properly the medical examination may be ineffective because of it results in a failure to correctly identify defects or medical conditions, or because of unnecessary discomfort, pain or injury experienced by a patient due to ineffective use of the medical examination tool.

Furthermore, the number of physical defects or medical conditions that medical professional trainees ought to be able to recognize in a patient's concealed anatomy can be significant. Prior art training methods involve displaying images of defects or conditions in a book or in a slideshow. The appearance of these defects or conditions in a book or projected on a screen as part of a slideshow is different than the way these defects or medical conditions appear when viewed during a medical examination. The different appearance can be due to use of the appropriate medical examination tool, the specific lighting, the limitations for manoeuvring the medical examination tool due to space restrictions defined by the relevant anatomy, or concern for the comfort of, or pain to, the subject patient. Medical professionals must be trained to recognize physical defects and medical conditions in the environment of the concealed anatomy of the body part, and as viewed through the medical tool utilized to view the concealed anatomy. Without the appropriate training or experience, medical professionals can become disoriented in conducting medical examinations of body parts including concealed geometry.

Thus, ineffective or insufficient training can contribute to medical professionals making mistakes while detecting and attempting to accurately identify the relevant physical defects or medical conditions existing in a patient's concealed anatomy. The present invention offers a means of providing the required training to cause a medical professional to efficiently and effectively accurately identify physical defects or medical conditions within concealed anatomy because it simulates the defect or condition in the anatomy and requires use of the medical tool normally utilized in a medical examination to scope and view within the concealed anatomy.

The present invention is configured to provide an effective simulation of the appearance of the body part as it would appear in the course of a medical examination or medical procedure. The present invention also is operable to permit the selection from a variety of images of physical defects and medical conditions that may be viewed by a trainee in the apparatus simulated environment. In some embodiments of the present invention, the images may be categorized into subsets for more directed use of the present invention.

The images may be selected by the trainer and/or the trainee. Thus, the trainee can become familiar with viewing a wide variety of images of physical defects or medical conditions in the simulated environment and thereby become accustomed to identifying the defects and conditions as they would appear in a live subject patient. A trainee may benefit from the ability to choose particular images to view in order to become familiar with aspects of some physical defects or conditions at his or her leisure, or to learn better how to manipulate the medical tool within the body part to view a defect or condition. For example, a trainee may choose to view specific images during an individual practice session occurring outside of any trainer led session or testing session.

The wide variety of the images providing examples of a range of different physical defects and medical conditions that are available for training of a trainee in the present invention, including rare defects and conditions, is an element that causes the present invention to be cost-effective over the prior art. The prior art structures and approaches do not conceive of a design or method that enables a user to access to a wide assortment of images in a cost effective manner. The sheer range and volume of the images available to the trainees and trainers of the present invention and the method of providing these images to the trainees and trainers is cost-effective in light of the prior art and this is yet another benefit of the present invention over the prior art.

This present invention is particularly effective as a training simulation environment that provides access to an apparatus that provides training involving a significant number of different images, due to the design of the medical simulation apparatus and the overall system including the computer product aspect of the present invention. The apparatus, system and computer product of the present invention are provided in a cost effective manner. In comparison to prior art systems, the training/instruction value relative to cost that is provided by the present invention is cost effective. For example, an embodiment of the present invention that is configured for the trainer to be located remotely from one or more of the trainees may permit a world-expert to train trainees that are located in areas scattered world-wide. In this manner, the present invention may permit trainees in remote areas to receive hands-on simulated environment training from world-experts. Providing this level of hands-on simulated environment training to trainees in locations remote from the world-expert, and possibly remote from other trainees, is not possible with prior art systems.

Moreover, a trainee located remotely from a training facility may utilize an apparatus, that is linked to a computer system and a trainer, or that is a relative stand alone unit, to train to recognize a wide variety of physical defects and medical conditions in a simulated environment. Such training would not be available to a remotely located trainee by prior art systems, as prior art systems offer a limited number of images to a trainee, images that differ from the appearance of the defect or condition in a live subject patient, and images that are not viewed through a medical tool in a simulated environment of a concealed anatomy and therefore do not appear as they do to a medical professional in a medical examination. Thus, the novel and innovative design of the present invention represents a significant advancement of the art, and provides a practical and cost effective system for broader dissemination of training instructions and/or training practice to trainees.

Additionally, it may be possible for an individual trainee to utilize a stand alone apparatus for the purpose of training to use a medical tool within a body part having a concealed anatomy. When used in a stand alone manner, the apparatus of the present invention may provide images to the trainee by way of the viewer, to be viewed through the medical tool within the body part by the trainee. The viewer may be configured to provide the images without the assistance of any outside computer element. Alternatively, in another embodiment of the present invention a computer element that stores and is operable to provide the images to a user may be incorporated in the apparatus.

In yet another embodiment of the present invention, the apparatus may be linked, by a wired or wireless means, to a computer, laptop or other device, that is local to the trainee. A version of the medical training computer program of the present invention may be installed, through a download or other means, on the local computer, laptop or other device, so that the local computer, laptop or other device is enabled to operate the medical training computer program.

In this embodiment of the present invention, the medical training computer program may be configured to be operable to provide training to the trainee that may be utilized simultaneously with the apparatus, such as through oral communication teaching provided while the trainee utilized the apparatus and views particular images provided to the viewer of the apparatus by the computer program. Portions of the training may also be provided non-simultaneously with the use of the apparatus by the trainee. The computer program may further be operable to provide for practice and testing sessions whereby the trainee may utilize the apparatus to practice and test his or her skills of manipulating the medical tool within the body part and accurately identifying physical defects or medical conditions.

Furthermore, an apparatus of the present invention that is linked to a trainer, and/or a group including a trainer and other trainees, may be configured to also be utilizable in a stand-alone manner from time to time. In this embodiment of the present invention the trainee may practice or test his or her skills on the apparatus outside of any specific trainer led session or official testing session.

An additional aspect of some embodiments of the present invention that can keep the cost of the present invention relatively low is selection of components, and the arrangement of such components. The quality of the simulation provided by the apparatus and system of the present invention may remain intact even if lower cost components are selected and arranged in the present invention.

The present invention is described herein in relation to medical examinations where use of the specialized medical tools involves viewing and identification of physical defects or medical conditions. Embodiments of the present invention may also be used for training medical professional trainees to perform medical procedures that involve utilizing a specialized medical tool and interacting with medical tissue having a specific appearance. In such an embodiment of the present invention, the viewer may be operable to present to the trainee for viewing one or more images of medical tissue having specific appearances. The images will cause the medical tissue to be presented to the trainee in a manner that simulates how the medical tissue would appear in connection with the relevant medical procedure. The trainee may view the images through the specialized medical tool that would be utilized for the medical procedure when the medical tool is within the concealed anatomy that is simulated by the physical model element of the present invention. A skilled reader will recognize that the present invention may be utilized for other training uses purposes as well.

The present invention is further disclosed herein as a training tool, however, as many physical defects, medical conditions and medical tissues affecting patients may be rarely encountered during medical practice, the present invention may also be utilized by medical professionals as a means of research, comparison or confirmation of defects, conditions or tissues viewed in live patients for the purpose of accurately identifying the patient's defect, condition or tissue. In a similar manner, the present invention could also be utilized for updating or refreshing the skills of a medical professional. For example, a medical professional who is required to examine one or more patients susceptible to defects, conditions or tissues that the medical professional has not encountered or identified in the recent past (such as defects, conditions or tissues caused by an epidemic outbreak, those prevalent in a particular population the medical professional is about to work with, or any other reason that a medical professional may need to update or refresh his or her skills) may utilize embodiments of the present invention to update or refresh his or her diagnostic skills. A medical professional about to work with a different patient population than they are accustomed to, such as children as opposed to adults, who will have different body part sizes and formations, may utilize embodiments of the present invention to update or refresh his or her tool manipulation skills. A skilled reader will recognize the variety of implementations that the present invention may have other than specifically as a training tool.

System and Computer Program Implementations

The FIGs incorporated and described herein relate to specific embodiments of the present invention. For example, the FIGs relate to an apparatus and system of the present invention wherein the physical model is a body part that is an ear, or an eye. These embodiments of the present invention are provided as examples of possible embodiments of the present invention, and a skilled reader will recognize that embodiments of the present invention may incorporate physical model elements for other body parts of a human or animal having concealed anatomy, for example, such as a nose, or any other body part. A skilled reader will further recognize that the images that may presented to a user for viewing by the view element of the present invention may include images of physical defects, medical conditions, medical tissue or any other image relevant to training, that pertain to any of the body parts provided as physical model elements of the present invention.

One or more physical model elements may be provided as part of embodiments of the present invention. A physical model element of embodiments of the present invention may be removable from the apparatus and system and replaceable with another physical model element. For example, a physical model element that represents a human ear may be connected to an apparatus or system of the present invention, and this ear physical model may be disconnected, or otherwise removed from the apparatus or system. Another physical model element, such as one representing a dog snout, may then be connected to the apparatus or system of the present invention. In this manner, an apparatus or system of the present invention may be utilized for training involving a variety of body parts, as various physical model elements, each representing a different body part of a human or animal, may be connected to the apparatus or system.

In some embodiments of the apparatus or system of the present invention, the apparatus or system may recognize the physical model element connected to the apparatus or system at any point in time and may function to provide by way of the viewer solely images relating to the body part of the animal or human represented by the physical model element connected to the apparatus or system. In other embodiments of the present invention, any of the images available to the apparatus or system may be presented by the viewer at any time.

The choice as to which image is to be presented by the viewer may be made by the trainee, the trainer, or the computer program element of the present invention, depending on the embodiment of the present invention and the mode of operation of the present invention. For example, in a mode whereby a trainee may test their skills, the computer program element of the present invention may choose the images presented by the viewer, whereas, during a training session involving a trainer, the trainer may choose the images. A skilled reader will recognize all of the possible means of providing images by a viewer and the modes of operation that may be incorporated in embodiments of the present invention.

FIG. 1 illustrates one embodiment of a medical training system of the present invention that incorporates at least one medical training simulation apparatus. The system of this embodiment of the present invention comprises at least one computer 10. The computer may be a desktop computer or laptop that is linked to a mouse 28, screen 30 and keyboard 27. A trainer 32 may be able to operate the computer by way of the mouse, screen and/or keyboard. It should be understood that in other embodiments of the present invention, the computer may also be a tablet computer or any other computer device operable to allow a trainer access to the functions of the medical training computer program of the present invention. In particular, the trainer may operate the computer to view the images of physical defects or medical conditions that are simultaneously displayed to the one or more trainees by operation of the at least one medical training simulation apparatus.

During a training session that is led by a trainer, the trainer must be able to view the images that are simultaneously provided to each trainee in the trainer's group by the viewer of the apparatus because the trainer will explain the various features of the physical defects or medical conditions shown in the images to the trainee. The trainer may thereby provide information to the trainees regarding the defects or conditions that a trainee needs to know in order to be able to recognize and become familiar with the defects and conditions. The computer operated by the trainer may further be operable to provide tools to the trainer whereby the trainer can point to or otherwise highlight notable aspects of the defects or conditions shown in the images to the trainees.

The computer program of the present invention may further be operable so that the computer may be used by the trainer user to initiate, follow and/or control one or more medical training routines embodied in the medical training computer program of the present invention.

As shown in FIG. 1, the computer 10 may be linked, for example, such as through splitter 14, to a plurality of medical training simulation apparatuses 12, each being a simulation unit. The computer may incorporate or otherwise be connected or linked to a plurality of images 16. The images may include archived images. The images may be stored in a database. The plurality of images 16 may include images showing physical defects, medical conditions or medical tissues pertaining to a specific body part.

The plurality of images may be displayed to a trainee in a medical training simulation apparatus by way of operation of a video display 18 that is a viewer element of the apparatus whereby images are presented to a trainee as a viewable image. The plurality of images that may be displayed in each medical training simulation apparatus may include a wide range of images showing a number of different physical defects, medical conditions or medical tissues. For example, the images may include images of physical defects or medical conditions that are relatively rare, and that therefore may not be found in human or animal subjects that may be available for medical training purposes. In this way, by operation of the present invention, one or more trainees may access, at a relatively low cost, a complete or substantially complete set of images, meaning that the set of images covers a wide variety of possible physical defects or medical conditions, and potentially all known defects and conditions, that can affect a particular body part. It is also possible for the images to be stored as identified as being groupable into subsets, or for subsets to be provided as image sets. For example, a subset may include images relating to physical defects, medical conditions and/or medical tissues that are prevalent in a particular area or for a particular segment or group of a population. As another example, a subset may include images relating specifically to rare defects, conditions or tissues. As yet another example, a subset may include images relating defects, conditions or tissues encountered specifically in populations of a particular age, such as children or aging adults. In this manner, embodiments of the present invention may provide sets or subsets of images, and for the purpose of training medical professionals, research or refreshers for medical professionals, or confirmation of an encounter with a rare defect, condition or tissue by a medical professional. A trainee or medical professional may not require exposure to a wide variety of images in some instances of use of the present invention, and embodiments of the present invention may be operable so that a trainee, trainer or medical professional may choose to limit use of the present invention to a subset of images.

The medical training simulation apparatus 12 includes a video display 18 and may include a controller 20 that provides on board control of the video display 18, whereby one or more images selected to be consecutively displayed to the trainee utilizing the apparatus by way of the video display. It should be understood that the control function of controller may be provided by connecting the apparatus 12 to the computer 10. This connection may be by way of a wired or wireless means, for example, such as a USB, a wireless data connection or any other suitable data connection between the apparatus and the computer. Through this connection, the computer program of the present invention that is operable by the computer is also operable to control the images displayed to the trainee by way of the video display.

By including the controller in the simulation unit, however, the simulation unit may enable one or more simulations by operation of the simulation unit as a self-contained, or stand alone, unit. This may enable the medical training simulation apparatus to be used in connection with a training routine initiated or directed by a trainer user of the computer, or a practice routine initiated by a trainee user of the computer without the involvement of the trainer user.

The simulation unit 12 may also include an optical means 22 that may be optics operable to alter the one or more images displayed by the video display 18. This alteration of the image by the optical means may be configured to cause the appearance of the one or more images to be a realistic appearance that is relative to the manner in which the defects or medical conditions would appear, using a medical examination tool, in a medical examination of a real subject patient.

A physical model may be incorporated in the simulation unit, or mounted on the simulation unit. The physical model may be formed to simulate the geometry that the medical professional is required to navigate using the medical examination tool when conducting a medical examination simulated. The simulation geometry may differ for particular embodiments of the invention, and the physical model may represent different body parts of a human or animal that has concealed anatomy.

As an example, FIG. 1 shows an embodiment of the present invention that includes a physical model 24 representing a body part that is an ear, and that is formed to simulate the geometry of the ear for the purpose of otoscopy training. The physical model may be removeably connected to the apparatus housing, or otherwise integrated with the apparatus housing. A skilled reader will recognize that a variety of connection means may be utilized in embodiments of the present invention to connect a physical model to the apparatus housing.

A skilled reader will further recognize that the physical model of embodiments of the present invention may be formed to represent other body parts and to simulate the concealed geometry of such other body parts. Moreover, a skilled reader will recognize that multiple physical models may be attachable to the housing of the apparatus, so that multiple physical models, representing a variety of body parts, may each be individually connected to housing of the apparatus, so that one physical model is connected to the apparatus housing at one time. Multiple physical models may thereby be utilized with the other elements of the apparatus, including the video display, so that the apparatus and system of the present invention may provide a means of training in relation to a variety of body parts. The computer, video display and/or the optical means may be configured to cause the images displayed on the video display to simulate the appearance of defects or conditions shown in the images in the apparatus to appear as such defects or conditions appear in a live subject patient. The present invention may therefore provide a means of simulating the use of medical tools relevant to several body parts (for which there are physical models provided with the present invention) to view a simulation of the environment of a variety of defects and conditions viewable through the use of the medical tool.

As shown in FIG. 1, a trainee 34 may utilize a medical tool 15, for example, such as an otoscope. The medical tool may be inserted within the physical model by the trainee. The trainee may therefore utilize the medical tool inserted within the physical model to view an image presented through the video display by way of optics. The optics and video display may be incorporated in the apparatus, and the physical model may be attachable to the apparatus.

In an embodiment of the present invention, a memory (not shown) may also be incorporated or connected to the of the simulation unit and linked to the controller such that the images may be integrated with the simulation unit.

In another embodiment of the present invention, an input means (not shown) may be linked to the controller, such that a trainee user of the simulation unit may selectively control the simulation unit to vary the images displayed by the video display. Any manner of input means may be used such as a computer device linked to the simulation unit (not shown) for use by the one or more trainee users. The input device is operable so that the trainee user may select one or more libraries, sets or subsets of images stored to the database. The input means may be integrated with the simulation unit, for example, such as by providing access to a trainee to an external touch screen or pad for interfacing with one or more computer program components for displaying information. Access may further be provided by way of one or more menus whereby one or more libraries, sets or subsets of images may be selected by the trainee, and a trainee may navigate within each selected library, set or subset of images.

The computer program of the present invention may be implemented on the trainer side computer or a trainee side computer. The computer program may generally be configured so as to enable the creation of a training routine. The training routine may be developed and designed to provide training relating to and involving the display of one or more images of physical defects or medical conditions. For example, the computer program may include or be linked to a software utility for creating a trainer lesson or presentation. The trainer lesson or presentation may include one or more images, and also associated text, links, audio files, animations, or other content that serves the purpose of instruction or training in connection with the images. The content may be used by a trainer to explain the features of the images or associated information such as medical information concerning the defects or medical conditions shown in the images.

As discussed herein, the training session may involve an audio component and oral communication means or device, whereby oral communication between the trainee(s) and a trainer may occur to facilitate a lesson. The audio communication means or device may be integrated with the present invention system or may be distinct from the system, but cooperative with the system (such as a separate dial-in telephone conference call linking the trainer and the trainee(s), or a video conference on a laptop, or an online streaming video session on a computer, etc.). The communication means or device may include a telephone, a smart phone, a tablet, a computer, a laptop, a sound system or speaker system, or any other communication means or device. The oral communication may be bi-directional between the trainee(s) and trainer, or may only flow from the trainer to the trainees.

The computer program may further provide automated training sessions to one or more trainees, whereby no trainer is involved in the training session. Training sessions may involve the apparatus as well as segments whereby the trainee(s) views information, videos, or other content on a computer screen and does not utilize the apparatus, or may be provided solely through use of the apparatus. The automated training sessions may include an audio component which may be provided by a communication means or device that is any communication means or device described herein, and is a communication means or device integrated, linked to or otherwise connected with the present invention.

The lesson or presentation, by operation of the computer program, that may be controlled by a trainer or an automated training session of the computer program, may be linked to the display of the images in the one or more apparatus. In this manner the trainer (or the computer program) navigates within the lesson or presentation and the medical training apparatus automatically displays the image or designated images indicated by the computer program, or otherwise chosen by the trainee. For example, the lesson or presentation operated by the computer program may include a slide or equivalent with information and that is linked to at least one of the images. The images for the lesson or presentation will be shown in a consecutive manner to the trainee through the video display of the apparatus, in accordance with the progression of the lesson or presentation.

The computer program of the present invention on the trainer side may be operable to display for the instructor a user interface including one or more areas. Each area may show to the trainer the image that the trainee sees in the apparatus in real time or near real time. A trainer is thereby able to conduct a training session for one or more trainees and in real time or near real time, wherein he or she may deliver instructions in response to what the trainer sees which includes the image that the trainee is viewing in the apparatus. The trainer may additionally see any or all of the following: further information; step-by-step instruction; detailed direction; feedback; or any other information relating to the lesson or presentation.

An advantage of the present invention over the prior art is that the trainer can provide effective instruction to more than one trainee student at a time and can be fully aware of the image that is viewable by each trainee as the trainee is viewing said image. Prior art technologies generally merely provide for one-on-one training sessions and the trainer is not necessarily aware of what the student is viewing at any particular point in time.

In another aspect of the instruction control computer program, the program includes a lesson plan creation component that provides instructions with a series of tools or templates for creating or assembling, and then storing to a database, a new lesson plan, tutorial or other training module, for use in connection with the system described. The lesson plan creation component of the present invention allows for the creation of different lesson plans based, for example, on the specific subject of one or more medical images. As an example, in connection with an otoscopy implementation of the present invention, different lesson plans may be created depending on the subject patient age, given that there are differences in the parameters of otoscopy that are driven by age. In such a training module, a first lesson plan may relate to otoscopy on an infant, a second lesson plan may relate to otoscopy for a juvenile, a third lesson plan may relate to otoscopy for an adult. A skilled reader will recognize the wide variety of lesson plans and modules that may be created an incorporated in the present invention.

In some embodiments of the present invention, one or more resources associated with the computer, or resources linked to or otherwise connected with the computer, may be implemented in a web server architecture or using cloud resources. This may enable central access to shared resources including medical images or lesson plans. Access to medical images or lesson plans may be provided as a web service or cloud service whether based on a subscription basis, pay per use basis or other model. Such access may also assist trainees having an apparatus of the present invention who are located remote areas to receive training that would not otherwise be available in such remote locations.

Embodiments of the present invention may also integrate one or more sensors or cameras operable to collect data regarding the trainee's actions. The collected data may be analyzed by operation of an assessment module of the computer program to generate assessments of performance, either automatically or on a user guide or approved basis. For example, the collected data may indicate force of a medical tool upon the physical model, depth of insertion of a medical tool into concealed anatomy of the physical model, time lapsed during use of a medical tool to view a simulated physical defect or medical condition shown as an image in the apparatus, or any other data relating to the use of the apparatus by a trainee. The analysis may provide feedback to a trainee such as whether aspects of the manipulation of the tool would be likely to cause pain for a patient, whether the length of time to view the defect or condition would likely cause discomfort for a patient, or any other analysis results.

In some embodiments of the present invention, and for some purposes, for example, such as a review or a practice session, the display of the images may be controlled by the trainee. If the trainer is involved in the session or linked in to the session, for example, such as review of a scheduled practice session, the computer program may display a screen to the trainer that shows the image being viewed by the trainee that was selected by the trainee.

If multiple trainees are individually controlling the display of images, for example, such as multiple trainees in a group of a trainer and trainees, the trainer may be able to view each of the images being viewed by each of the trainees as the images are viewed by the trainees simultaneously, or to choose to see the images being viewed by individual trainees or a sub-group of trainees. In such an embodiment of the present invention, the computer may be connected to two or more medical training simulation apparatuses. The computer program may be operable to display multiple screens to the trainer, each screen displaying the image then selected by the trainee for viewing by operation of the medical training simulation apparatus. The trainees in this case may control the display of images, whether based on, for example, a sequence defined by a lesson plan, or based on their individual discretion. If a trainee has a question, or the trainer wishes to selectively provide instruction to one or more trainees, the trainer may select the medical training simulation apparatuses of interest from the multiple screens (for example, such as is identified by a label associated with the particular apparatus or its user), to see what is being viewed by the trainees, and provide comments, instruction or feedback accordingly to one, several or all of the trainees.

In one embodiment of the present invention, the lesson or presentation of images may automatically follow the images viewed by one or more users simultaneously as controlled on the trainee side.

In an embodiment of the present invention, the trainer side computer program may be configured to be responsive to input from the trainer user (by way of the computer) regarding navigation between the images, slides presented to the trainer that incorporate information only displayed to the trainer and one or more images, or other similar content. The trainer side computer program may be operationally linked to the one or more medical training simulation apparatus, so that the computer program controls the video display and causes it to display the image selected by the trainer by way of the trainer's navigation between the images, slides or other similar content.

In an embodiment of the present invention wherein a computer is linked to the medical training simulation apparatus at the trainee side, the computer may be configured to display the lesson or presentation, or a trainee version thereof. This may be useful to check features highlighted in the version of the image shown in the medical training simulation apparatus, or to view associated information displayed in the lesson or presentation such as magnified features of specific area, links to associated information, and other content.

In another embodiment of the present invention, the trainer side computer program may be operable to allow the trainer to initiate the computer program to mark the images, for example, such as marking using a digital overlay. Such marking may be utilized to highlight, lasso, point to or otherwise select one or more areas of the one or more images. A suitable input means, for example, such as a digital pen or mouse, may be utilized for marking. The trainer may further initiate the video display in the apparatus of each trainee connected to the trainer to show these aspects marked in the images, as initiated by the trainer. So that the one or more images displayed by the video display of each apparatus utilized by a trainee, will show the image with the markings incorporated in the image by the trainer.

Alternatively, markings on one or more images may be displayed by the computer on the trainee side. As a still other alternative, the trainee side computer program may enable the same or similar operations which may serve to highlight the areas of one or more images. For example, one or more trainees may be able to highlight a specific area in an image. The trainees may utilize this facility of the present invention to mark a section of an image that the trainee has a question about so a trainer can better understand the trainee's question. This facility of the present invention may have other uses as well.

Embodiments of the present invention may be implemented to achieve distance learning. One or more features described above may be used to enable training where the trainer and one or more trainees are at different locations. Each trainee will have an apparatus to use during training session and may also have a trainee side computer, although a trainee side computer is not necessary for remote training. The trainer will have a trainer side computer operable to run the training computer program. It will be obvious to a person skilled in the art that a suitable remote access and control technology can be deployed between the computer and one or more medical training simulation apparatuses at one or more remote locations from the computer, and also optionally between the computer and the trainee side computer associated with the medical training simulation apparatus at the trainee location, so as to enable remote training operations. For example, the computer may be linked to one or more medical training simulation apparatuses to enable remote control of each apparatus by the trainer by operation of the trainer's trainer side computer program.

In embodiments of the present invention, the database may be linked to a web server or cloud computing network, optionally configured to enable upload and sharing of images by multiple users in multiple locations. The database linked to a web server or cloud computing network may further be operable to download of one or more images from a plurality of medical training simulation apparatuses linked to the web server or cloud computing network via the Internet.

The system of the present invention may also incorporate a testing component that requires, for example, each trainee to follow an exercise that involves viewing of one or more the images of specific physical defects or medical conditions using the medical training simulation apparatus. The user may be required to provide feedback, for example, such as orally answering a question so that the answer is captured using a voice recording, providing input to a computer linked to the apparatus, or engaging an input means integrated with the apparatus. Questions in a test session may be for example, multiple choice questions associated with the image and displayed by the computer, and/or may ask a trainee to identify the defect or condition shown in a particular image.

The answers provided by the one or more trainees in a test session may be captured, and then analyzed for accuracy. In a particular implementation of the present invention, the results may be analyzed, and tracked over multiple training sessions and/or test sessions so as to monitor progress of training and report on the same. The results for each trainee may be displayed to the trainer, said trainee, and/or all trainees. Displaying results of all trainees for all of the trainees to see may foster competition amongst the trainees. Results may further be analyzed relating to a group of trainees, or all trainees utilizing the system.

Other aspects of gaming may be introduced in the present invention, for example, such as by defining rules requiring the trainees to identify correctly a particular number of physical defects or medical conditions from a series of images correctly, without exerting force using their medical examination tool that exceeds a defined threshold for a selected area of the physical model. Force exerted may be calculated using a sensor, for example, such as a sensor array integrated with the physical model. In this manner, both identification of defects and conditions as well as skilful manipulation of the medical tool in the body part may be taught and assessed by the present invention. A skilled reader will recognize how other sensors may further be integrated in the physical model to provide for other types of training and assessment of the diagnostic and medical tool manipulation skills of the trainees.

A skilled reader will recognize that numerous training sessions, routines and operations are possible in accordance with the present invention. Embodiments of the present invention may incorporate various system and network configurations to facilitate and support particular training sessions, routines and operations, and to provide a wide range of possible medical training options and parameters. A skilled reader will recognize that various configurations and derivatives may be incorporated in embodiments of the present invention.

Structure of Medical Training Simulation Apparatus

Figure 8:
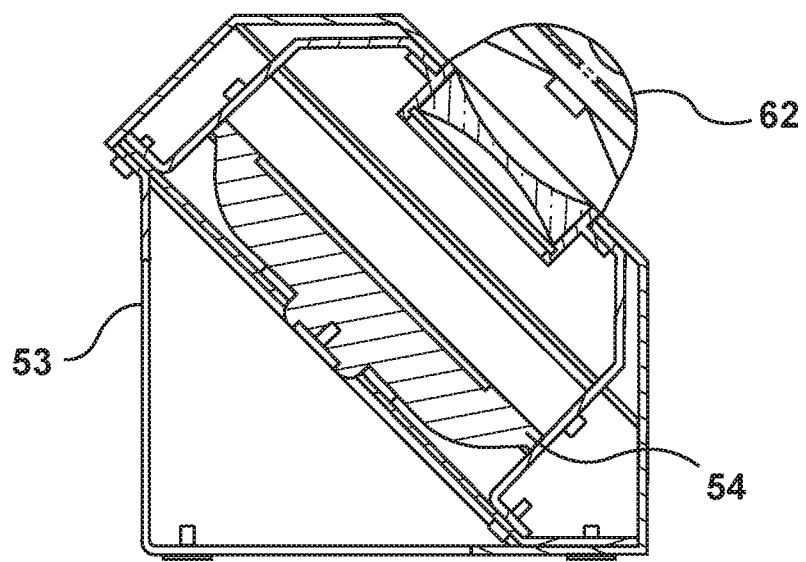
FIG. 8 is a side sectional view of 8 a representative embodiment of the present invention that having a physical model that is an eye body part attached thereto.
Figure 9:
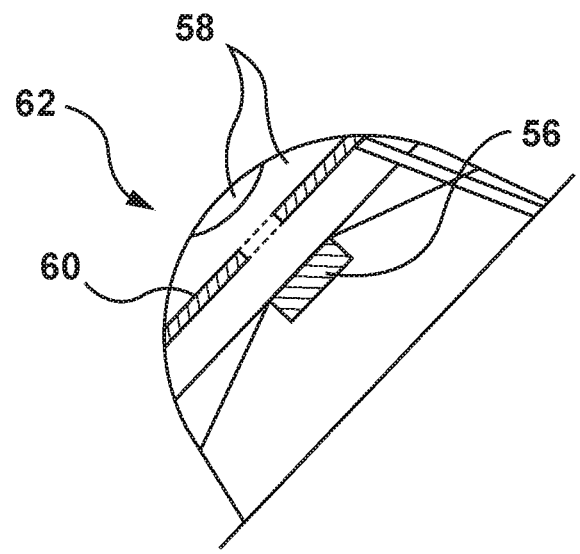
FIG. 9 is a side view of a physical model of a representative embodiment of the present invention that is an eye body part.

FIGS. 2-6 illustrate a particular embodiment of the medical training simulation apparatus of the present invention that is configured to be utilizable for otoscopy training. FIGS. 7a-7f illustrate an alternate embodiment of the medical training simulation apparatus of the present invention having a different configuration, but still being utilizeable for otoscopy training. FIG. 8 illustrates an embodiment of the present invention that is configured to be utilizeable for ophthalmoscope training. FIG. 9 illustrates a physical model that may be incorporated in the present invention that is a representative of an eye body part. As shown in FIGS. 2-6, 7a-7f and 8, the medical training simulation apparatus may be arranged and configured to provide a table top medical training simulation unit, which can be used by a trainee either by standing or sitting.

Figure 2:
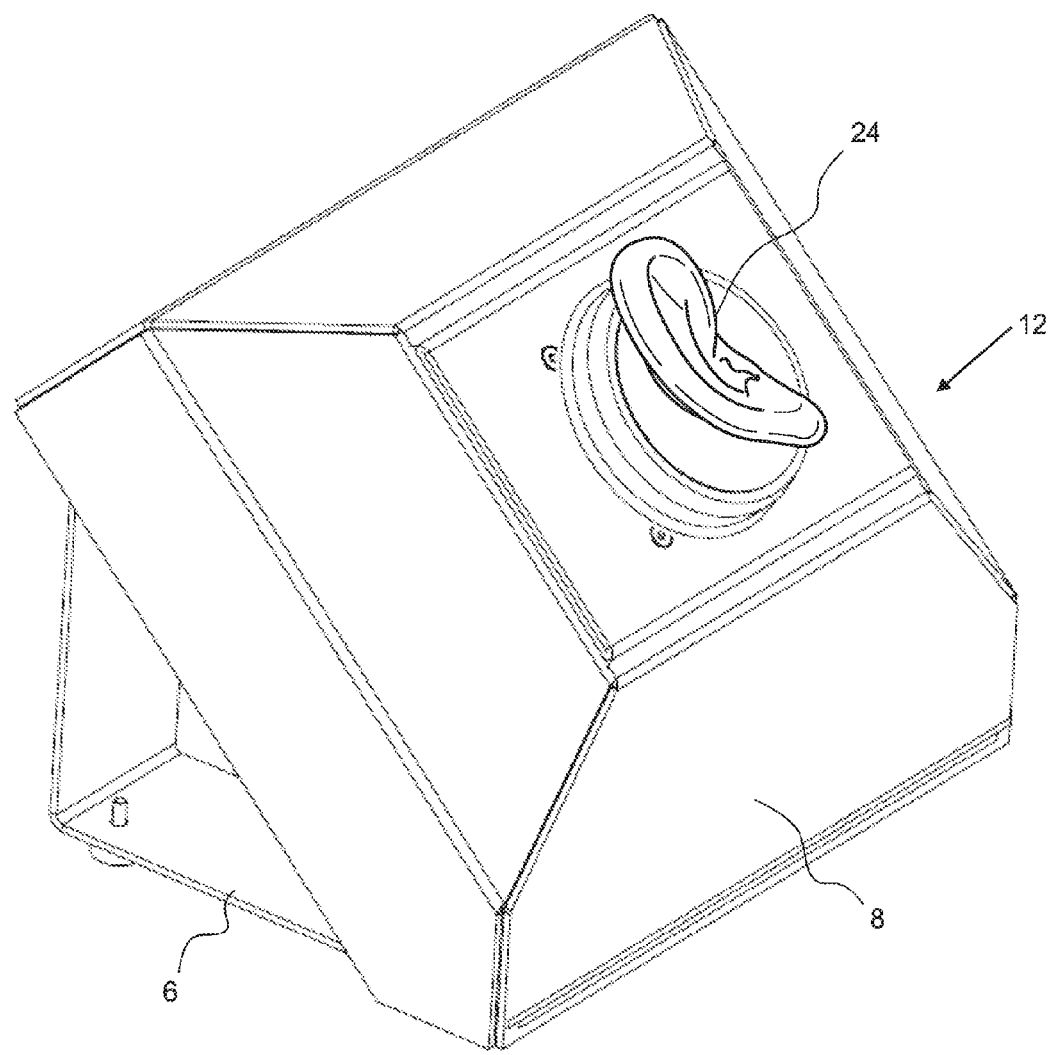
FIG. 2 is a perspective view of a representative embodiment of the medical training simulation apparatus of the present invention, showing the exterior of the apparatus.

Now referring to FIG. 2, the medical training simulation apparatus 12 incorporates a housing that comprises a base 6 and a top portion 8. The physical model 24, for example, such as is a representation of a relevant body part including concealed anatomy, and that is an ear in the specific embodiment shown in FIG. 2, is attachable to said housing, and specifically to the top portion of the housing. When the housing is attached to the physical model, the combined elements define a physical structure that enables the simulations and the training described herein.

The top portion includes a physical model, or a portion of the physical model. The physical model is used as part of the simulation of the medical examination or procedure involving the particular body part represented by the physical model. The base portion enables the unit to rest upon a surface in a manner that is flat, of virtually flat. For example, the base portion may rest upon a table. The base portion may be formed to hold and support the apparatus in a stationary position.

FIGS. 2-6 and 7a-7f illustrate particular embodiments of the invention, configured to assist in training for otoscopy and, therefore, the apparatus includes a physical model representing an ear model or simulated ear. The physical model may be disposed around the top of the medical training simulation apparatus. The physical model may be formed using a suitable material to simulate the body part, including its physiology, such as flexibility. For example, the physical model may be formed of a material that is easy to clean and is flexible to simulate the pulling of the body part. In embodiments of the present invention wherein a physical mode represents an ear, the physical model may be flexible to simulate pulling of the ear in order to displace the ear canal to permit viewing of the inside of the ear using the otoscope. A skilled reader will recognize that other physical models representing other body parts having concealed anatomy may be attachable to the top portion of the apparatus, and that suitable materials may be used to form such physical models to simulate characteristics of the body parts.

As an example, the physical mode that is representative of an ear, in one embodiment of the present invention, may define an opening and concealed anatomy, similar to the shape and appearance of the opening and concealed anatomy of an ear of a subject patient, being a human or an animal. The opening and concealed anatomy of the physical model representing an ear may extend to define a portion that simulates the ear canal, or the opening of the ear model may communicate with a channel defined by the physical structure of the medical training simulation apparatus, thereby simulating the ear channel.

Figure 3:
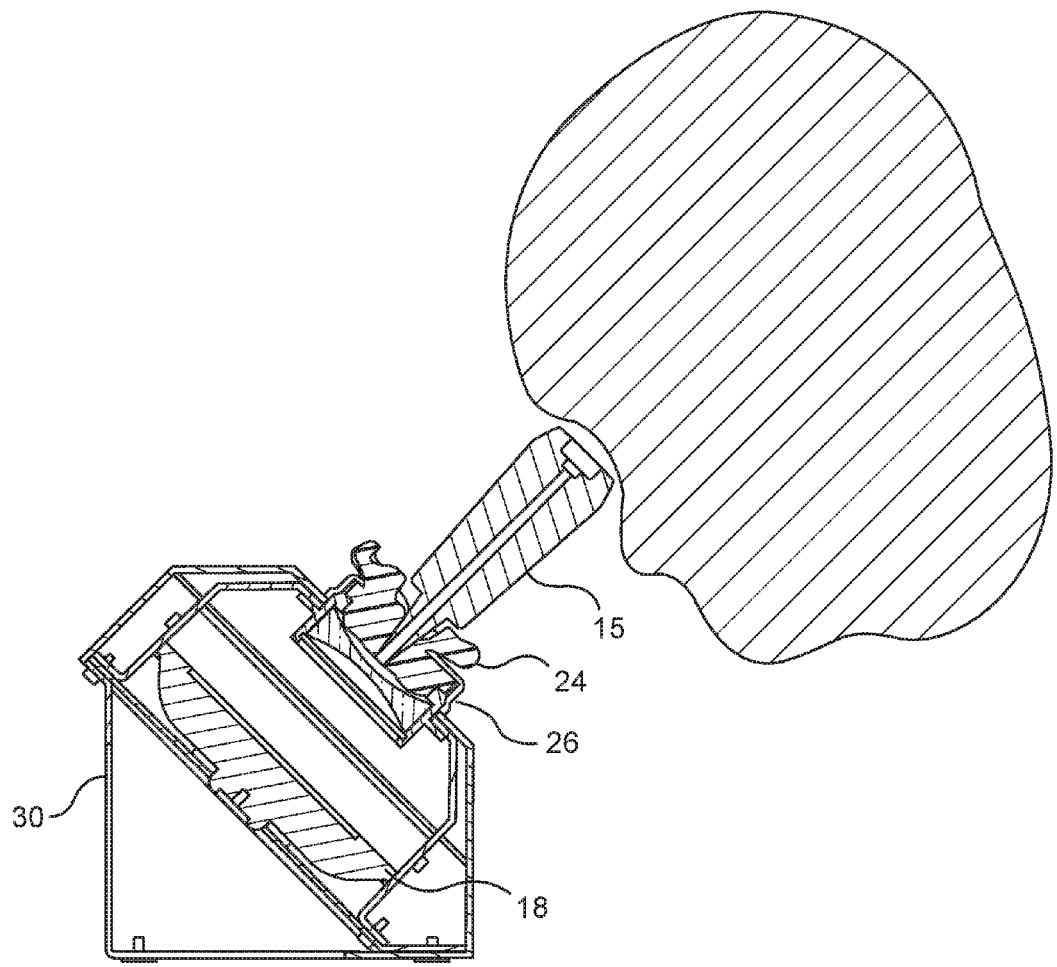
FIG. 3 is a sectional side view of a representative embodiment of the medical training simulation apparatus of the present invention.

The appropriate medical tool, as would be used in a medical examination of the body part represented by the physical model, may be inserted within the physical model. For example, an otoscope 15 may be inserted within the physical model 24 representing an ear, as shown in FIG. 3.

The physical model 24 may be attached to the top portion of the housing of the apparatus. A support frame 30 may support the apparatus upon a surface.

In an embodiment of the present invention, the physical model that represents an ear may be configured such that the outside of the ear of the physical model (which corresponding to the outside portion of an ear) may be pulled by the medical practitioner trainee to cause the ear canal of the physical model to become straightened to thereby permit the insertion of the otoscope (being the medical examination tool appropriate to be used with this particular embodiment of the present invention). In one embodiment of the present invention, the ear model may be formed from silicone.

The location and position of the physical model that is an ear upon and incorporated with the apparatus may be such that the portion simulating the ear canal is disposed such that a trainee is able to insert the otoscope through the opening of the physical model of the ear into the simulated ear canal of the physical model. In embodiments of the present invention, the ear canal portion of the physical model may be sized substantially to conform to the average size of a human or animal ear canal, so as to enable full insertion of the tip of an otoscope, similar to how an otoscope would be used on a human or animal subject. In another embodiment of the present invention, the ear canal portion may be configured to represent an ear having a known condition, for example, such as the ear canal portion may be an angulated ear canal portion or an ear canal portion with meatal stenosis (a narrowing of the ear canal) so as to add complexity to the simulation parameters. In another embodiment of the present invention, the physical model representing an ear may be configured to be reflective of paediatric conditions with an ear canal diameter ranging from three to 10 millimeters in diameter. A skilled reader will recognize how physical models representing other body parts may also be formed to simulate use of an appropriate medical tool and known conditions that may affect the body party represented by the physical model.

As an example, in one embodiment of the present invention, the physical model may represent an eye body part, as shown in FIG. 9. The physical model that is an eye may be comprised of aspects of the actual geometry of an average adult human eye with a horizontal distance, for example, such as of about 24 mm. The anterior segments of the eye may be recapitulated in the physical model representing an eye, consisting of the corneal layer 58, the ciliary body, and the iris. The corneal layer is represented by a clear plastic layer 2 mm thick, the iris is represented by an adjustable diaphragm 60, akin those found in a photographic camera that is photoresponsive by adjusting the diameter of the iris opening, and a lens 56, for example, such as a bi-convex lens, with a diameter of about 10 mm and an axial length of about 4 mm.

The physical model that represents an eye 62 may be attachable to an apparatus housing, as shown in FIG. 8. The retina may be represented by images of eye disorders projected on the video display system 54 in the apparatus. The support frame 53 of the apparatus may be configured to support the apparatus upon a surface and may be configured to hold the physical model at a particular angle in some embodiments of the present invention to enhance the experience of a simulated medical examination or procedure of the trainee utilizing the apparatus.

As shown in FIG. 3, the video display 18 may be disposed within the medical training simulation apparatus, and aligned with the physical model 24 such that the video display 18, or more specifically an area of the video display 18, is visible through the opening of the physical model 12. For example, if a physical model that represents an ear is attached to the apparatus, when the trainee user pulls the exterior ear portion of the physical model the video display is visible through the simulated ear canal. In a one implementation of the present invention, the apparatus may be configured such that the images are displayed on the video display so as to generally confirm with said area.

It should also be understood that the physical structure of the medical training simulation apparatus, in embodiments of the present invention, may be arranged and configured such that the physical model of the body part is spaced apart from the video display. This configuration may be applied in part to simulate the distance between aspects of the concealed anatomy that the trainee seeks to view during the simulated medical examination using the medical examination tool. The particular anatomy of the body parts with concealed geometry tends to be at a defined distance from the reach of the medical examination tool. For example, in the case of otoscopy, the defects or medical conditions of interest tend to be further along the ear canal than the otoscope can reach. This affects the appearance of the physical defects or medical conditions as such defects or conditions are viewable by a medical practitioner looking within the ear of an applicable subject patient. In some cases, otoscopy involves illuminating parts of the anatomy distal to the end of the otoscope. The present invention may be configured to display the one or more images in a way that simulates how the physical defects or medical conditions would appear in a live subject having the same defects or conditions.

The present invention may be defined in accordance with a configuration for a medical training simulation apparatus that achieves the objective of providing a realistic simulation representing how physical defects or medical conditions may appear in a live subject patient, but that also uses an arrangement of elements that is inexpensive to produce and easy to use.

The video display of embodiments of the present invention may be a standard digital display unit, for example, such as an LCD. This enables the use of a relatively low cost image display means, for example, such as a standard, off-the-shelf LCD video display that is common enough to be at a low cost due to economies of scale. As a further example, the LCD screen may be a 7 inch USB monitor that displays images of various pathologic conditions.

The fact that the medical training simulation apparatus of the present invention is configured in a way that it enables the use of this type of a display unit contributes to the relatively low cost of the apparatus of the present invention. This in turn makes the apparatus accessible to a significant number of medical practitioners. Some prior art systems require expensive equipment, which some practitioners cannot afford prior art systems are prohibitive so that some practitioners cannot access or use such prior art systems. Accessibility aspects provided by the apparatus of the present invention therefore offers access to improved training for medical practitioners in medical examinations involving body parts with concealed geometry generally.

In embodiments of the present invention, the video display may be connected to a USB port presented externally by the physical structure of the medical training simulation apparatus. The USB port may permit, for example, a cable connection to the trainer's computer. The USB port may alternately also permit a connection to a computer associated with the trainee. The USB port may further permit a connection to each of the trainer's computer and a computer associated with the trainee.

In one implementation of the present invention the medical training simulation apparatus unit may be configured such that the one or more images displayed by the image display unit are sized so that, when viewed from the opening of the physical model, the one or more images covers all of the area visible through the opening of the physical model. In one embodiment of the present invention, the image projected on the surface of the video display (e.g. standing image or video projection) may range in actual size, for example, such as from 2 to 4 inches in diameter. Image size may be modified depending on the nature of the image and the various optical parameters of the simulation apparatus.

The one or more images and/or their display by the video display may be adjusted such that the physical defects or medical conditions may be viewed using the appropriate medical examination tool. For example, the average otoscope magnifies at around 3× or 4×. The one or more images may be displayed such that when viewed using an otoscope (with the relevant magnification) they will appear as they would when viewed in a live human or animal subject patient during a medical examination or procedure.

The one or more images themselves may be made or selected so that they have an appearance, using lighting, exposure and other photographic techniques, that is consistent with the appearance of the relevant physical defects or medical conditions of the applicable body parts represented by the physical model attached to the apparatus.

The contour of the one or more images may be made to correspond to the profile of the opening defined by the physical model.

In another embodiment of the present invention, the one or more images may be displayed by the video display unit as relatively high resolution images. The tissue viewed inside in the body part during the course of the medical examination or medical procedure will generally not appear using the medical examination tool as a high resolution image, but rather will be visible to the medical practitioner using the medical examination tool in a way that exhibits a lower resolution or grainier quality. This is so because: (a) the tissue is spaced apart from the point of insertion of the medical examination tool; and (b) the appearance of the tissue is also affected by the magnification and illumination that is possible using the medical examination tool. It is therefore desirable in embodiments of the present invention to display the accurate colour and physical characteristics available using the relatively high resolution images, but the images may be modified in some way to simulate how these features would present in a real medical examination of a live subject patient.

In yet another embodiment of the present invention, the video display may be used and arranged to align with an optical means so as to provide a simple and cost effective means for altering the way in which the images appear to the human eye using a medical examination tool in relation to body parts with concealed geometry, while maintaining the colour and physical features of the images of the medical defects or conditions.

To this end, as shown for example in FIG. 3, the medical training simulation apparatus may be arranged in away that it permits the physical structure to retain an optical means, for example, such as a lens 26. The lens may be held in place, disposed between the channel portion of the physical model and the video display 18. The lens may be operable to, in effect, de-pixelate the one or more images. The lens may be selected to provide an effective means to simulate the appearance of the physical defects or medical conditions shown in the one or more images. In one embodiment of the present invention, the lens may be selected such that in combination with, for example, the magnification of the medical examination tool (e.g. the 3× or 4× magnification provided by a standard otoscope), the lens provides sufficient de-pixelation of the one or more images. This may simulate the appearance of the physical defects or medical conditions shown in the images as they would appear in a medical examination of the human or animal subject patient, in accordance with the image that applicable subject of the image (e.g., human or animal). In one embodiment of the present invention, the selected lens that adjusts most appropriately to the nature of the image being projected, dimensions of the simulation unit, accounts for the magnification of the examination tool, and maximizes resolution is a biconcave lens with, for example, such as the following approximate dimensions: 12 mm diameter, central thickness of 3 mm, focal length of −12 mm, BFL of −12.81 mm and AR coating on both sides.

Figure 4:
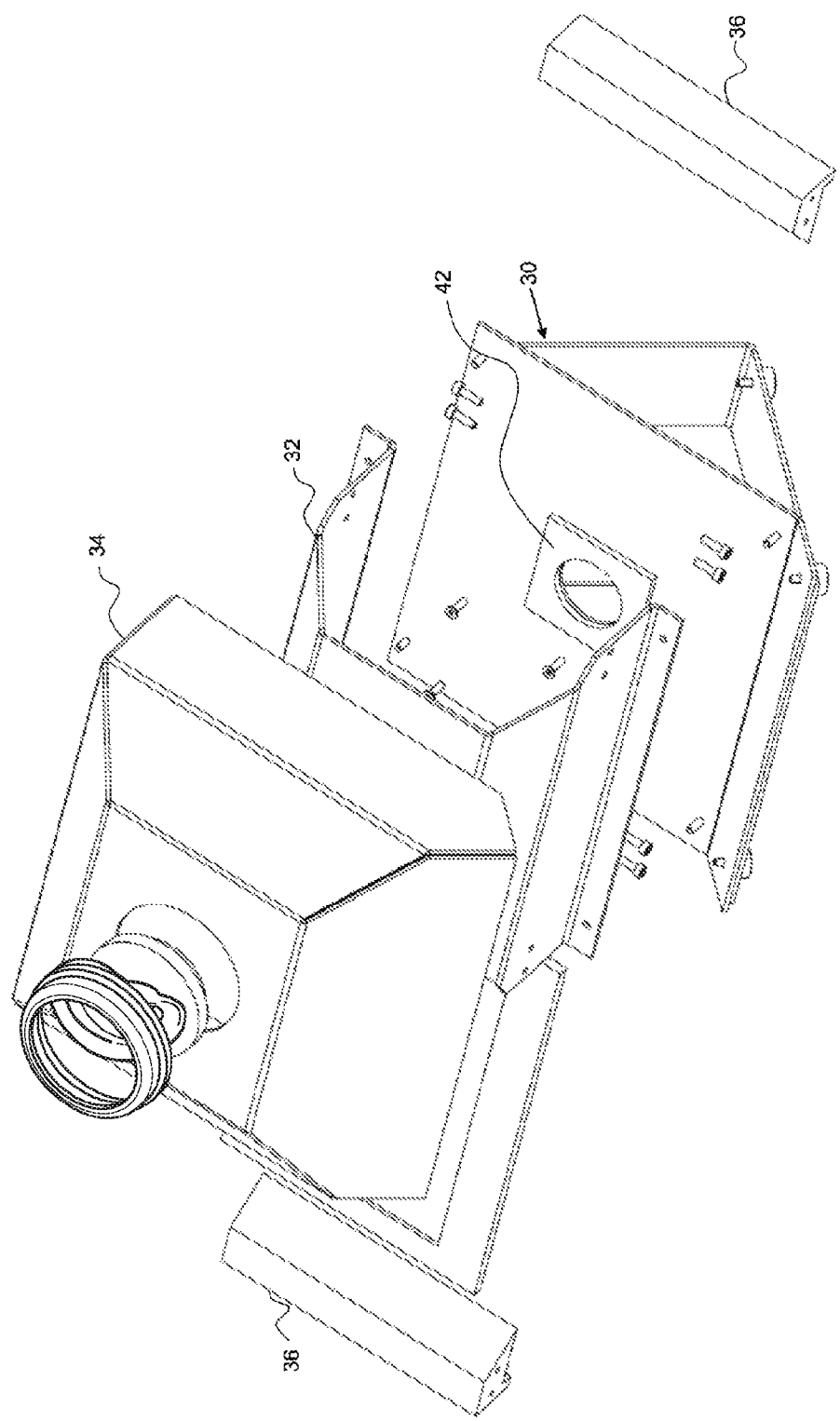
FIG. 4 is an exploded view of a representative embodiment of the medical training simulation apparatus of the present invention.

As shown in FIG. 4, for example, the apparatus may include a support frame 30, which may comprise a holder 42 that is operable to receive the video display and maintain the video display in place. Additional mounting means, for example, such as screws or clamps, may be used to hold the video display in place. An inner frame 32 may define the spaced apart relationship of the physical model and the video display. A lid 34 may be mounted onto the inner frame 32. The lid 34 may include an opening for receiving the physical model and incorporating the physical model in the apparatus.

An optional feature that may be included in embodiments of the present invention, such as is shown in FIG. 4, includes the light guides 36. The light guides may enable some of the light from the display to be directed to back illuminate a brand identifier cut out formed in the body of the apparatus. A rectangular acrylic prism shaped with three acute angles and one obtuse angle to enable light entering from the bottom surface to be internally reflected and emitted out from the opposite face may be optionally be included.

Figure 6:
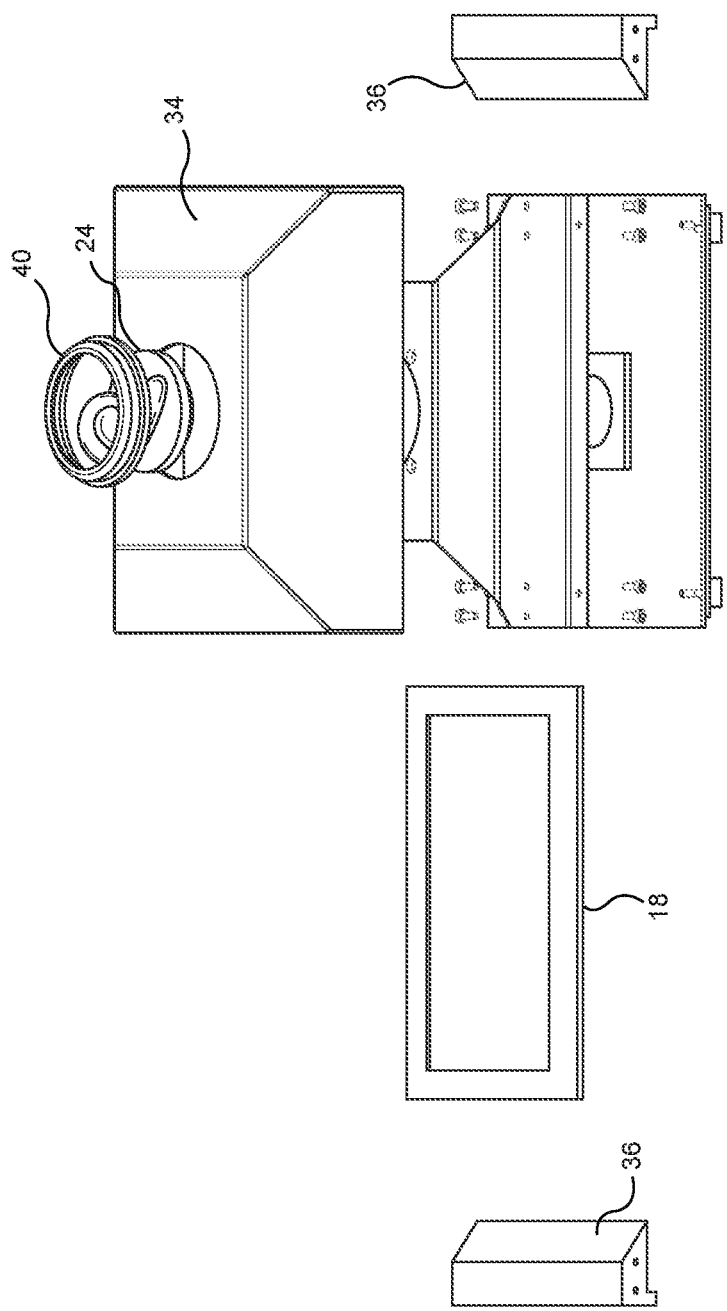
FIG. 6 is an exploded view of a representative embodiment of the medical training simulation apparatus of the present invention.

Multiple light guides 36 may be incorporated in an embodiment of the present invention, as shown in FIG. 6. The light guides may surround the video display 18, wholly or partially. The light guides may incorporate holes whereby the guides may be held in place in the apparatus by screws or other attachment means. A lid 34 may be mounted as a top portion of the apparatus. The lid 34 may include an opening for receiving the physical model 24 and incorporating the physical model in the apparatus. A retaining ring 40 may be utilized to removeably connect the physical model and incorporate it in the apparatus.

Figure 5:
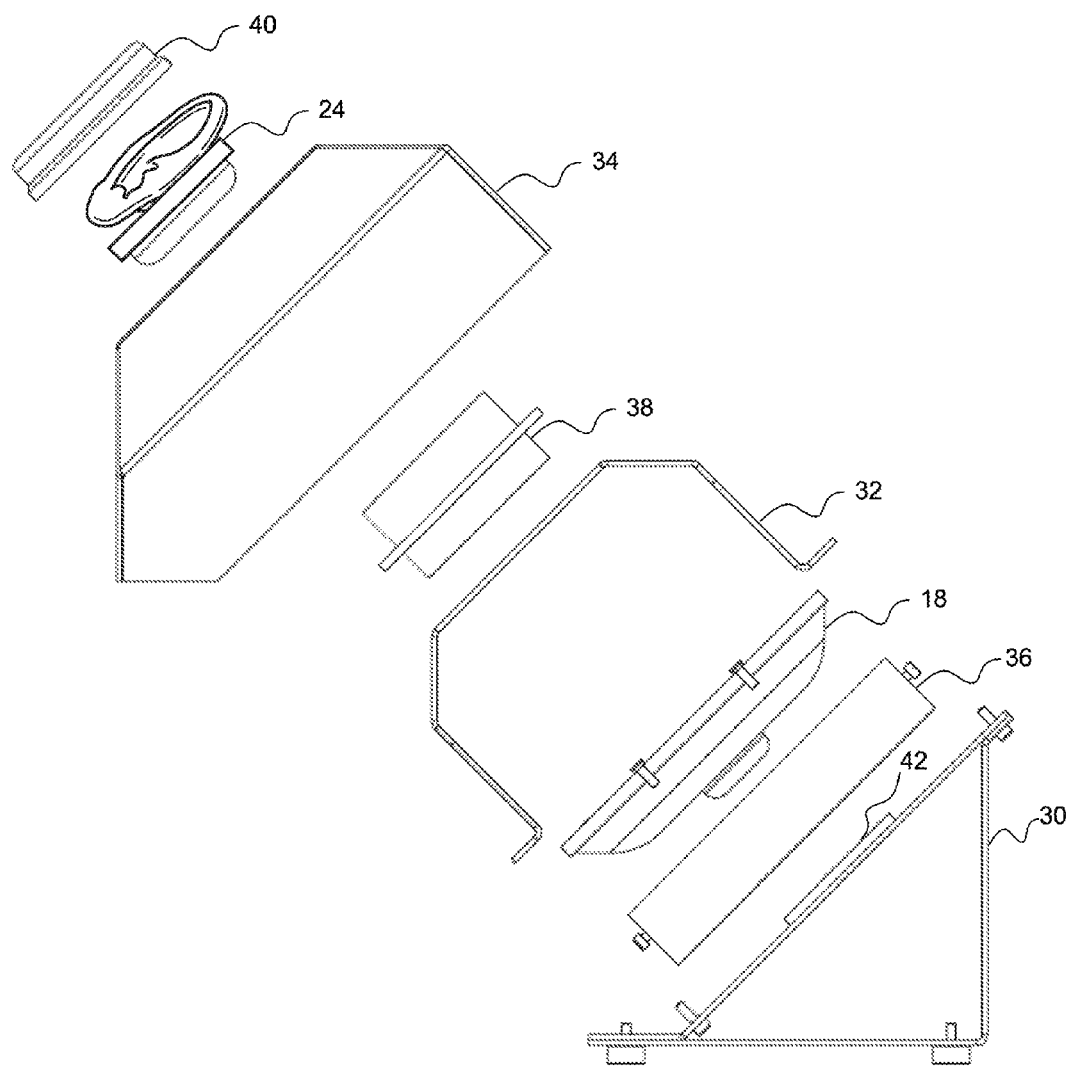
FIG. 5 is an exploded side view of a representative embodiment of the medical training simulation apparatus of the present invention.

As shown in FIG. 5, in another embodiment of the present invention a support frame 30, may comprise a holder 42 that is operable to receive the video display 18 and maintain the video display in place. A light guide 36 may be incorporated in the apparatus so as to surround wholly or partially the video display. An inner frame 32 may define the spaced apart relationship of the physical model and the video display, and also retain a lens holder 38. A lid 34 may be mounted onto the inner frame 32. The lid 34 may include an opening for receiving the physical model and incorporating the physical model in the apparatus. The opening may also receive the lens holder 38. As shown in FIG. 5, the lens holder 38 and a retaining ring 40 may co-operate to hold the lens and the physical model 24 in place, such that the opening referred to above and the video display are aligned, with the lens 26 disposed there between.

Figure 7A:
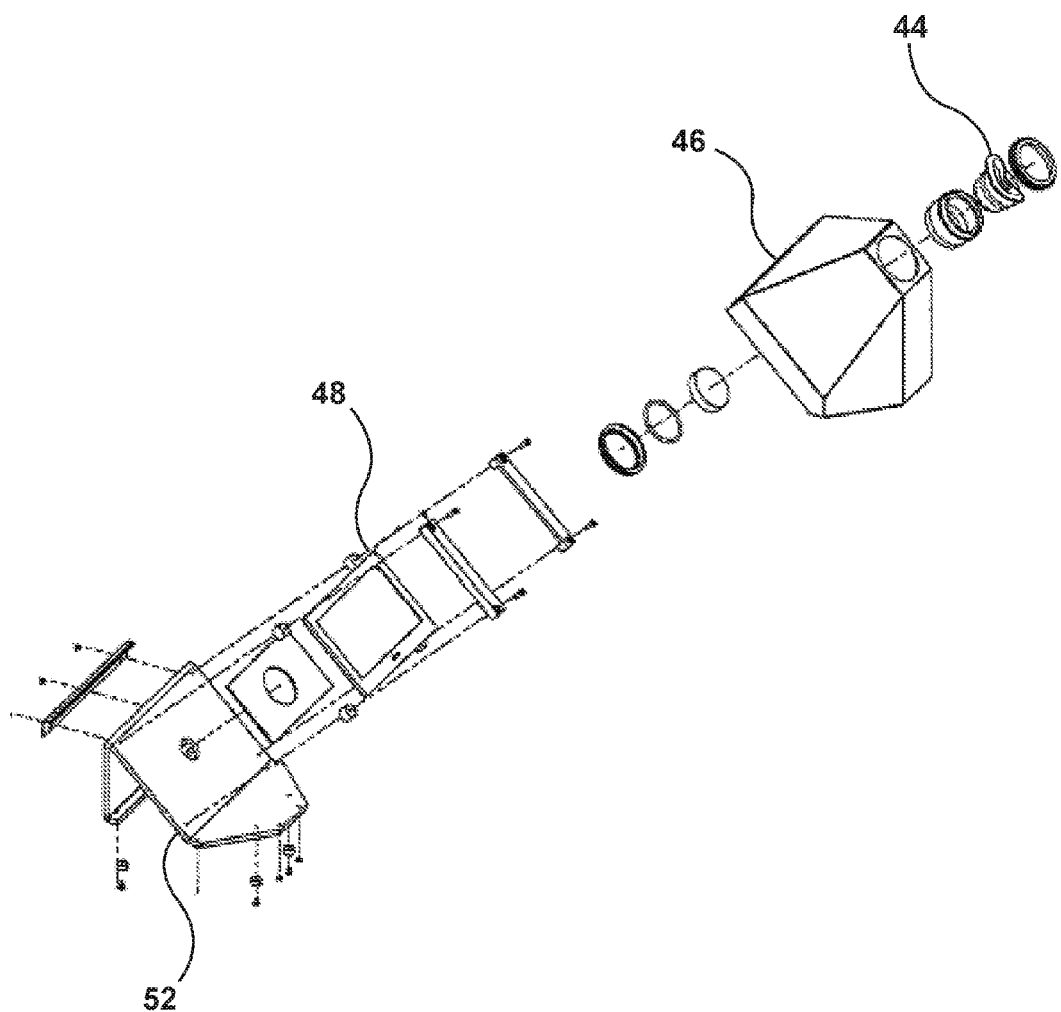
FIG. 7a is an exploded view of a representative embodiment of the present invention that does not include light guides.

As shown in FIG. 7a, alternative configurations of embodiment of the present invention may be utilized to assemble the apparatus, so that a video display 48 is house between a support frame 52 and a top portion 46. Said top portion having a physical model 44 attachable thereto. The embodiment of the present invention shown in FIG. 7a notably does not incorporate light guides.

Figure 7B:
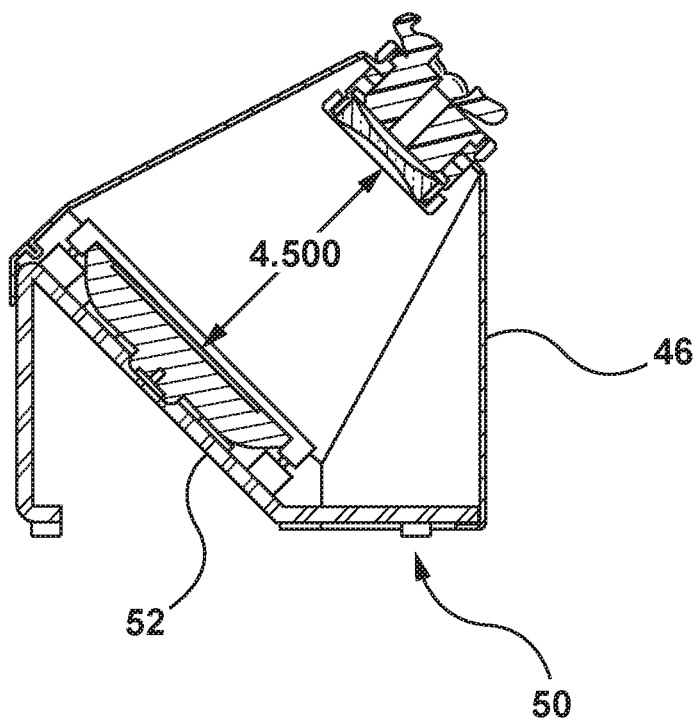
FIG. 7b is a sectional side view of a representative embodiment of the present invention that dos not include light guides.
Figure 7C:
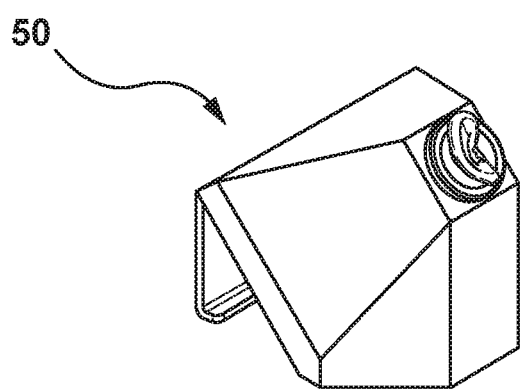
FIG. 7c is a perspective view of a representative embodiment of the present invention that dos not include light guides.
Figure 7D:
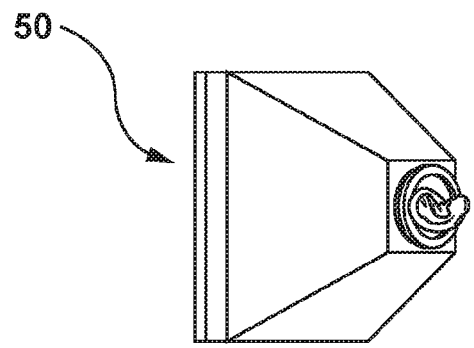
FIG. 7d is a side perspective view of a representative embodiment of the present invention that dos not include light guides.
Figure 7E:
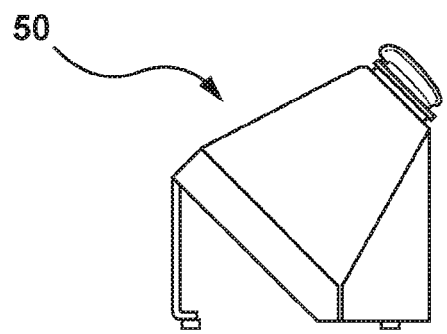
FIG. 7e is a side view of a representative embodiment of the present invention that dos not include light guides.
Figure 7F:
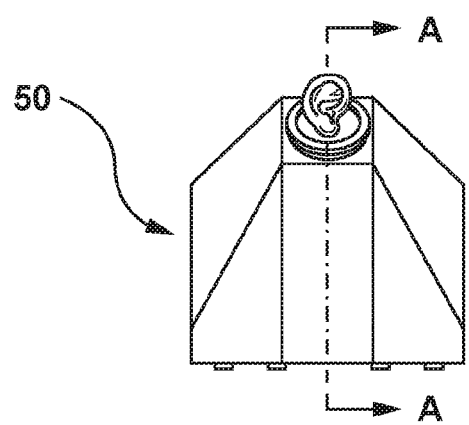
FIG. 7f is a perspective view of a representative embodiment of the present invention that dos not include light guides.

As shown in FIG. 7b, when assembled, an embodiment of the present invention apparatus 50 may be configured so that the support frame 52 is attached to the top portion 46. Views of an assembled embodiment of the present invention apparatus 50 are shown in FIGS. 7c, 7d, 7e and 7f.

Computer Implementation

The computer system, computer program, and computer implemented method aspects of the present may be practiced in various embodiments. A suitably configured computer device, and associated communications networks, devices, software and firmware, may provide a platform for enabling one or more embodiments as described above. By way of example, it should be understood that computer may refer to a generic computer device that may include a central processing unit ("CPU") connected to a storage unit and to a random access memory. The CPU may process an operating system, application program, and data. The operating system, application program, and data may be stored in storage unit and loaded into memory, as may be required. Computer device may further include a graphics processing unit (GPU) which is operatively connected to CPU and to memory to offload intensive image processing calculations from CPU and run these calculations in parallel with CPU. An operator may interact with the computer device using a video display connected by a video interface, and various input/output devices such as a keyboard, mouse, and disk drive or solid state drive connected by an I/O interface. In known manner, the mouse may be configured to control movement of a cursor in the video display, and to operate various graphical user interface (GUI) controls appearing in the video display with a mouse button. The disk drive or solid state drive may be configured to accept computer readable media. The computer device may form part of a network via a network interface, allowing the computer device to communicate with other suitably configured data processing systems (not shown). One or more different types of sensors may be used to receive input from various sources.

The present system and the computer implemented methods described may be practiced on virtually any manner of computer device including a desktop computer, laptop computer, tablet computer, provided that optimal processing, memory and other hardware/software requirements are met. The present system and method may also be implemented as a computer-readable/useable medium that includes computer program code to enable one or more computer devices to implement each of the various process steps in a method in accordance with the present invention. It is understood that the terms "computer-readable medium" and "computer useable medium" comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

Other Implementations

A skilled reader will recognize that numerous implementations of the technology of the present invention are possible.

For example, embodiments of the present invention may include various sensors whereby aspects of the simulated medical examination or procedure undertaken by the trainee using the apparatus may be collected. The sensors may be chosen and positioned so as to gather information regarding aspects of the simulated medical examination or procedure such as relating to the patient experience of the medical examination or procedure, relating to aspects of use of the medical tool by the trainee, or other aspects of the process of the trainee's hands-on experience of use of the simulated body part and the use of the appropriate medical tool.

For example, an embodiment of the present invention may be extended to provide haptic feedback to the user, for example by incorporating one or more haptic devices in the physical structure of the apparatus of the present invention. For example, the physical model may be constructed so as to trigger an alarm if a user touches a sensitive area of a body part or manipulates the body part in a way that is not desired (e.g. pulls on the ear too hard, or comes into contact with a portion of the surface of the ear canal that given a defect for example is particularly sensitive). The alarm may consist of auditory feedback or vibration of the physical model, or some other signal.

As another example, the physical model of an embodiment of the present invention may be constructed to include a sensor array (for example covering the inner surfaces of the physical model, or a portion thereof, such as the simulated ear canal or other body part represented by the physical model). The sensitivity of the sensors in the array may be configured, working with clinicians, to correspond to the sensitivity of the body part in specific areas thereof. In a further aspect of the invention, a sensor array profile may be associated with each image, as the sensitivity of a body part may vary depending on the particular defect or medical condition. For example, force feedback sensors could be used such that once a user brings the medical examination tool into contact with a specific sensor, in a particular area of the physical model, and expresses with the medical examination tool a force that exceeds a specific threshold, an alarm or other feedback mechanism may be triggered.

In another embodiment of the present invention, the physical model may be impregnated with a combination of torque and pressure sensors in the helix, scapha and fossa triangularis regions of the outer ear model. The pressure sensors may provide a feedback signal following detection of excessive force exerted by the trainee during use of the medical examination tool. High acuity force-pressure sensors may be placed below the surface of the canal region of the physical model, for example, such as approximately 1.5 mm, to enable sensing of excessive force. Vibrations and noise may be emitted from the unit when excessive force is exerted on any regions of the physical model. To this end the apparatus of such embodiments of the present invention may incorporate a speaker or other sound emitter means.

In the case of such an embodiment of the present invention wherein the physical model represents an eye body part, a photosensor for modulating the opening diameter of the diaphragm (iris) component in incorporated into the model. When light is emitted from the medical examination tool (for example, such as the ophthalmoscope) into the eye of the physical model, a constriction and narrowing of the diaphragm (iris) opening may occur.

The haptic and feedback mechanisms described above that may be incorporated into the physical models use in embodiments of the present invention, may enable more accurate simulation of real clinical scenarios.

A skilled reader will further recognize that the structure of embodiment of the medical training simulation apparatus of the present invention may be altered for telescopic viewing or three-dimensional viewing.

We claim:

1. A medical training method, characterized in that it comprises the steps of:
   (a) a plurality of users engaging a simulation system to initiate a medical training routine, by means of one or more computer processors, the simulation system including a video display that is disposed within the simulation system and aligned with a physical model such that an area of the video display is visible to the plurality of the users through the opening of the physical model at least during or following physical manipulation of a portion of the physical model, a controller for controlling the video display that displays one or more medical images, and optics configured to optically alter the one or more images;
   (b) each of the plurality of users inserting a medical examination tool into an opening defined by the simulation system to represent a body part, the medical examination tool having an optical pathway through which the each of the plurality of users is able to directly view the area of the video display that is visible through the opening of the physical model; and
   (c) the plurality of users using the medical examination tool to view an interior defined by the simulation system that simulates the concealed anatomy of the body part by optically altering the one or more images so as to simulate the appearance of the interior of the body part when viewed using the medical examination tool,
      wherein the one or more images are optically altered by the optics to show physical defects or medical conditions that would appear in a medical examination of a real subject patient.

2. The medical training method of claim 1, characterized in that it comprises the further step of the plurality of users engaging the simulation system to initiate a medical training routine that is any of the following: a simulated medical examination; or a simulated medical procedure.

3. The medical training method of claim 1, characterized in that it comprises the further step of video display displaying the one or more images and thereby simulating any of the following: a physical defect; a medical condition; or medical tissue.

4. The medical training method of claim 1, characterized in that it comprises the further step of a trainer controlling the display of the one or more images by the video display to at least one of the plurality of users by control of the controller.

5. The medical training method of claim 4, characterized in that it comprises the further step of the trainer accessing training program materials and controlling the controller in association with the training program materials to train the at least one of the plurality of users.

6. The medical training method of claim 5, characterized in that it comprises the further step of the trainer training the at least one of the plurality of users by using the training program materials and providing oral instruction relating thereto.

7. The medical training method of claim 1, characterized in that it comprises the further step of the plurality of users testing their skills of manipulation of the medical examination tool when said medical examination tool is inserted in the opening of the simulation system, and identification of a physical defect or medical condition the appearance of which is simulated by the simulator system.

8. A medical training apparatus, characterized in that the apparatus comprises:
   (a) one or more physical models of a body part consecutively attachable to the medical training apparatus, each physical model including an opening and defining a structure that simulates concealed geometry of said body part, said opening being configured to enable a trainee to insert a medical examination tool therein, the medical examination tool having an optical pathway through which the trainee is able to directly view an area of the video display that is visible through the opening of the physical model;
   (b) a video display controllable to display at least one medical image relating to the body part of one of the one or more physical models attached to the medical training apparatus, the video display disposed within a housing of the medical training apparatus and aligned with the one or more physical models such that an area of the video display is visible to the trainee through the one or more openings of the one or more physical models at least during or following physical manipulation of one or more portions of the one or more physical models; and
   (c) optics for altering the at least one image such that its appearance simulates the appearance of the content of the image within the concealed geometry of a condition existing within the body part of the one of the one or more physical models attached to the medical training apparatus when viewed using the medical examination tool inserted in the one or more physical models, the at least one image being optically altered by the optics to show the condition that would appear in a medical examination of a real subject patient; and
   wherein said medical training apparatus is operable to achieve a simulation for training the trainee to: manipulate the medical examination tool within the body part of the physical model; and identify the condition within the concealed geometry of the body part of the one of the one or more physical models attached to the medical training apparatus.

9. The medical training apparatus of claim 8, characterized in that it further comprises the one or more physical models being models of any body part having concealed geometry including any of the following body parts: an ear; a nose; an eye; or a throat.

10. The medical training apparatus of claim 8, characterized in that it is operable for training simulations including any of the following: medical procedure training; and medical examination training.

11. The medical training apparatus of claim 8, characterized in that the medical examination tool is a medical examination tool appropriate for insertion into the body part of the physical model attached to the apparatus.

12. The medical training apparatus of claim 8, characterized in that the one or more medical images are images having content that is any of the following relating to the body parts of the physical models: physical defects; and medical conditions.

13. The medical training apparatus of claim 8, characterized in it further comprises a computer incorporating one or more computer processors configured to operate a computer program, said computer program being operable to control a medical training module and control the video display and the display of the one or more medical images for the purpose of training the trainee.

14. The medical training apparatus of claim 13, characterized in that it further comprises an input means connected to the computer for operation of the computer program by a trainer to control the medical training module.

15. The medical training apparatus of claim 8, characterized in that it further comprises a database connected to the medical training apparatus wherein the one or more medical images are stored.

16. The medical training apparatus of claim 8, characterized in that it further comprises an optics positioned between the physical model attached to the apparatus and the video display, said optics being operable to de-pixelate the one or more medical images displayed on the video display.

17. The medical training apparatus of claim 8, characterized in that the one or more physical models are formed of a material that simulates the physiology of the body part of each of the physical models.

18. The medical training apparatus of claim 8, characterized in that one or more sensors are positioned within the apparatus so as to be configured to correspond to the sensitivity of the body part of the physical model, said one or more sensors being operable to sense force or other simulated sensitization imposed upon the body part of the physical model by the medical examination tool used by the trainee.

19. A medical training system, characterized in that the system comprises:
   (a) one or more medical training apparatuses operable to achieve a simulation for training a plurality of trainees, each medical training apparatus comprising:
      (i) one or more physical models of a body part consecutively attachable to the medical training apparatus, each physical model including an opening and defining a structure that simulates concealed geometry of a body part, said opening being configured to enable a trainee of the plurality of trainees to insert a medical examination tool therein, the medical examination tool having an optical pathway through which the trainee is able to directly view an area of a video display that is visible through the one or more openings of the one or more physical models;
      (ii) the video display controllable to display at least one medical image relating to the body part of one of the one or more physical models attached to the medical training apparatus, the video display disposed within the one or more medical training apparatuses and aligned with the one or more physical models such that an area of the video display is visible to the trainee through the one or more openings of the one or more physical models at least during or following physical manipulation of one or more portions of the one or more physical models; and
      (iii) an optics for altering the at least one image such that its appearance simulates the appearance of a condition within the concealed geometry existing within the body part of the one of the one or more physical models attached to the medical training apparatus when viewed using the medical examination tool inserted in the physical model, the at least one image being optically altered by the optics to show the condition that would appear in a medical examination of a real subject patient; and
   (b) one or more computers linked to one or more of the one or more medical training apparatuses, each of the one or more computers incorporating one or more computer processors configured to operate a computer program, said computer program being operable to control a medical training module and control the video display and the display of the one or more medical images for the purpose of training the plurality of trainees.

20. The medical training system of claim 19, characterized in that the system further comprises:
   (a) the trainer operating one of the one or more computers and the medical training module thereon to instruct the plurality of trainees, each of the plurality of trainees having access to an apparatus, and
   (b) an oral communication means operable to provide oral communication between the trainer and the plurality of trainees.

* * * * *